United States Patent
Hendry et al.

(10) Patent No.: US 12,177,418 B2
(45) Date of Patent: Dec. 24, 2024

(54) METHOD FOR CODING IMAGE ON BASIS OF TMVP AND APPARATUS THEREFOR

(71) Applicant: LG Electronics Inc., Seoul (KR)

(72) Inventors: Hendry Hendry, Seoul (KR); Seunghwan Kim, Seoul (KR); Seethal Paluri, Seoul (KR)

(73) Assignee: LG Electronics Inc., Seoul (KR)

( * ) Notice: Subject to any disclaimer, the term of this patent is extended or adjusted under 35 U.S.C. 154(b) by 175 days.

(21) Appl. No.: 17/780,142

(22) PCT Filed: Dec. 7, 2020

(86) PCT No.: PCT/KR2020/017777
§ 371 (c)(1),
(2) Date: May 26, 2022

(87) PCT Pub. No.: WO2021/118191
PCT Pub. Date: Jun. 17, 2021

(65) Prior Publication Data
US 2022/0417498 A1    Dec. 29, 2022

Related U.S. Application Data

(60) Provisional application No. 62/946,424, filed on Dec. 10, 2019.

(51) Int. Cl.
| | | |
|---|---|---|
| *H04N 19/46* | (2014.01) | |
| *H04N 19/105* | (2014.01) | |
| *H04N 19/132* | (2014.01) | |
| *H04N 19/137* | (2014.01) | |
| *H04N 19/169* | (2014.01) | |
| *H04N 19/176* | (2014.01) | |

(52) U.S. Cl.
CPC ......... *H04N 19/105* (2014.11); *H04N 19/132* (2014.11); *H04N 19/137* (2014.11); *H04N 19/176* (2014.11); *H04N 19/188* (2014.11); *H04N 19/46* (2014.11)

(58) Field of Classification Search
None
See application file for complete search history.

(56) References Cited

U.S. PATENT DOCUMENTS

2012/0287999 A1    11/2012    Li et al.
2014/0301463 A1    10/2014    Rusanovskyy et al.
(Continued)

FOREIGN PATENT DOCUMENTS

KR    20170020798    2/2017

OTHER PUBLICATIONS

Pettersson et al., "AHG17: On NAL unit type table," Joint Video Exprts Team (JVET) of ITU-T SG 16 WP 3 and ISO/IEC JTC 1/SC 29/WG 11, 16th Meeting: Geneva, CH, Oct. 1-11, 2019, Document: JVET-P0363-v2, 6 pages.

*Primary Examiner* — Mohammad J Rahman
(74) *Attorney, Agent, or Firm* — Fish & Richardson P.C.

(57) ABSTRACT

According to the disclosure of the present document, by signaling NAL unit-related information for a first picture and a collocated reference picture-related information for a second picture following the first picture in a decoding order, a collocated reference picture with respect to the second picture can be limited, and thus the image coding efficiency can be enhanced.

13 Claims, 15 Drawing Sheets

(56) References Cited

U.S. PATENT DOCUMENTS

| | | | |
|---|---|---|---|
| 2015/0146103 A1* | 5/2015 | Koo | H04N 23/80 |
| | | | 348/607 |
| 2015/0264404 A1* | 9/2015 | Hannuksela | H04N 19/30 |
| | | | 375/240.16 |
| 2016/0100189 A1* | 4/2016 | Pang | H04N 19/593 |
| | | | 375/240.13 |
| 2016/0134888 A1* | 5/2016 | Kazui | H04N 19/114 |
| | | | 375/240.12 |
| 2016/0255359 A1* | 9/2016 | Yu | H04N 19/46 |
| | | | 375/240.15 |
| 2016/0381393 A1* | 12/2016 | Tsukuba | H04N 19/44 |
| | | | 375/240.12 |
| 2018/0160132 A1* | 6/2018 | Hendry | H04N 19/172 |
| 2019/0174144 A1 | 6/2019 | Hannuksela | |
| 2019/0342581 A1* | 11/2019 | Deshpande | H04N 19/109 |
| 2021/0281868 A1* | 9/2021 | Deshpande | H04N 19/188 |

* cited by examiner

METHOD FOR CODING IMAGE ON BASIS OF TMVP AND APPARATUS THEREFOR

CROSS-REFERENCE TO RELATED APPLICATIONS

This application is a National Stage application under 35 U.S.C. § 371 of International Application No. PCT/KR2020/017777, filed on Dec. 7, 2020, which claims the benefit of U.S. Provisional Application No. 62/946,424, filed on Dec. 10, 2019. The disclosures of the prior applications are hereby incorporated by reference herein in their entirety.

BACKGROUND OF THE DOCUMENT

Field of the Document

The present document relates to video/image coding technology, and more particularly, to a method for coding an image based on temporal motion vector prediction (TMVP) in a video or image coding system, and an apparatus thereof.

RELATED ART

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

According to an embodiment of the present document, a method and an apparatus which increase image coding efficiency are provided.

According to an embodiment of the present document, a method and an apparatus for efficient inter prediction are provided.

According to an embodiment of the present document, a method and an apparatus for signaling NAL unit related information and temporal motion vector prediction (TMVP) related information are provided.

According to an embodiment of the present document, a method and an apparatus for limiting collocated reference picture to improve image coding efficiency are provided.

According to an embodiment of the present document, a method and an apparatus for emptying a motion vector field buffer to improve image coding efficiency are provided.

According to an embodiment of the present document, a video/image decoding method performed by a decoding apparatus is provided.

According to an embodiment of the present document, a decoding apparatus for performing video/image decoding is provided.

According to an embodiment of the present document, a video/image encoding method performed by an encoding apparatus is provided.

According to an embodiment of the present document, an encoding apparatus for performing video/image encoding is provided.

According to an embodiment of the present document, a computer-readable digital storage medium storing encoded video/image information generated according to the video/image encoding method disclosed in at least one of the embodiments of this document is provided.

According to an embodiment of the present document, a computer-readable digital storage medium storing encoded information or encoded video/image information causing a decoding apparatus to perform the video/image decoding method disclosed in at least one of the embodiments of this document is provided.

According to the present disclosure, it is possible to increase overall image/video compression efficiency.

According to an embodiment of the present document, it is possible to efficiently perform inter prediction.

According to an embodiment of the present document, it is possible to signal the NAL unit related information and the temporal motion vector prediction (TMVP) related information.

According to an embodiment of the present document, it is possible to limit the collocated reference picture in order to improve the image coding efficiency.

According to an embodiment of the present document, it is possible to empty the motion vector field buffer in order to improve the image coding efficiency.

DESCRIPTION OF EXEMPLARY EMBODIMENTS

Figure 1:
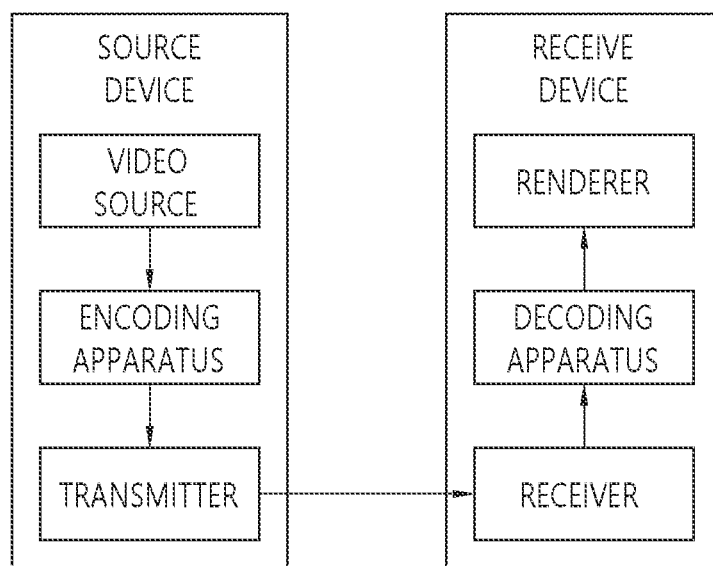
FIG. 1 schematically represents an example of a video/image coding system to which embodiments of the present disclosure may be applied.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

In addition, each configuration of the drawings described in this document is an independent illustration for explaining functions as features that are different from each other, and does not mean that each configuration is implemented with mutually different hardware or different software. For example, two or more of the configurations can be combined to form one configuration, and one configuration can also be divided into multiple configurations. Without departing from the gist of this document, embodiments in which configurations are combined and/or separated are included in the scope of claims.

Hereinafter, examples of the present embodiment will be described in detail with reference to the accompanying drawings. In addition, like reference numerals are used to indicate like elements throughout the drawings, and the same descriptions on the like elements will be omitted.

FIG. 1 illustrates an example of a video/image coding system to which the embodiments of the present document may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present document relates to video/image coding. For example, a method/embodiment disclosed in the present document may be applied to a method disclosed in the versatile video coding (VVC) standard. In addition, a method/embodiment disclosed in the present document may be applied to a method disclosed in the essential video coding (EVC) standard, the AOMedia Video 1 (AV1) standard, the 2nd generation of audio video coding standard (AVS2) or the next generation video/image coding standard (e.g., H.267, H.268, or the like).

The present disclosure suggests various embodiments of video/image coding, and the above embodiments may also be performed in combination with each other unless otherwise specified.

In the present disclosure, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of complete tiles or an integer number of consecutive complete CTU rows within a tile of a picture that may be exclusively contained in a single NAL unit Meanwhile, one picture may be divided into two or more subpictures. A subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, "A or B" may mean "only A", "only B" or "both A and B". In other words, "A or B" in this document may be interpreted as "A and/or B". For example, in this document "A, B or C" means "only A", "only B", "only C", or "any combination of A, B and C".

A slash (/) or comma (,) used in this document may mean "and/or". For example, "A/B" may mean "A and/or B". Accordingly, "A/B" may mean "only A", "only B", or "both A and B". For example, "A, B, C" may mean "A, B, or C".

In this document, "at least one of A and B" may mean "only A", "only B" or "both A and B". Also, in this document, the expression "at least one of A or B" or "at least one of A and/or B" means "at least one It can be interpreted the same as "at least one of A and B".

Also, in this document, "at least one of A, B and C" means "only A", "only B", "only C", or "A, B and C" Any combination of A, B and C". Also, "at least one of A, B or C" or "at least one of A, B and/or C" means may mean "at least one of A, B and C".

Also, parentheses used in this document may mean "for example". Specifically, when "prediction (intra prediction)" is indicated, "intra prediction" may be proposed as an example of "prediction". In other words, "prediction" in this document is not limited to "intra prediction", and "intra prediction" may be proposed as an example of "prediction". Also, even when "prediction (i.e., intra prediction)" is indicated, "intra prediction" may be proposed as an example of "prediction".

Technical features that are individually described in one drawing in this document may be implemented individually or may be implemented at the same time.

Figure 2:
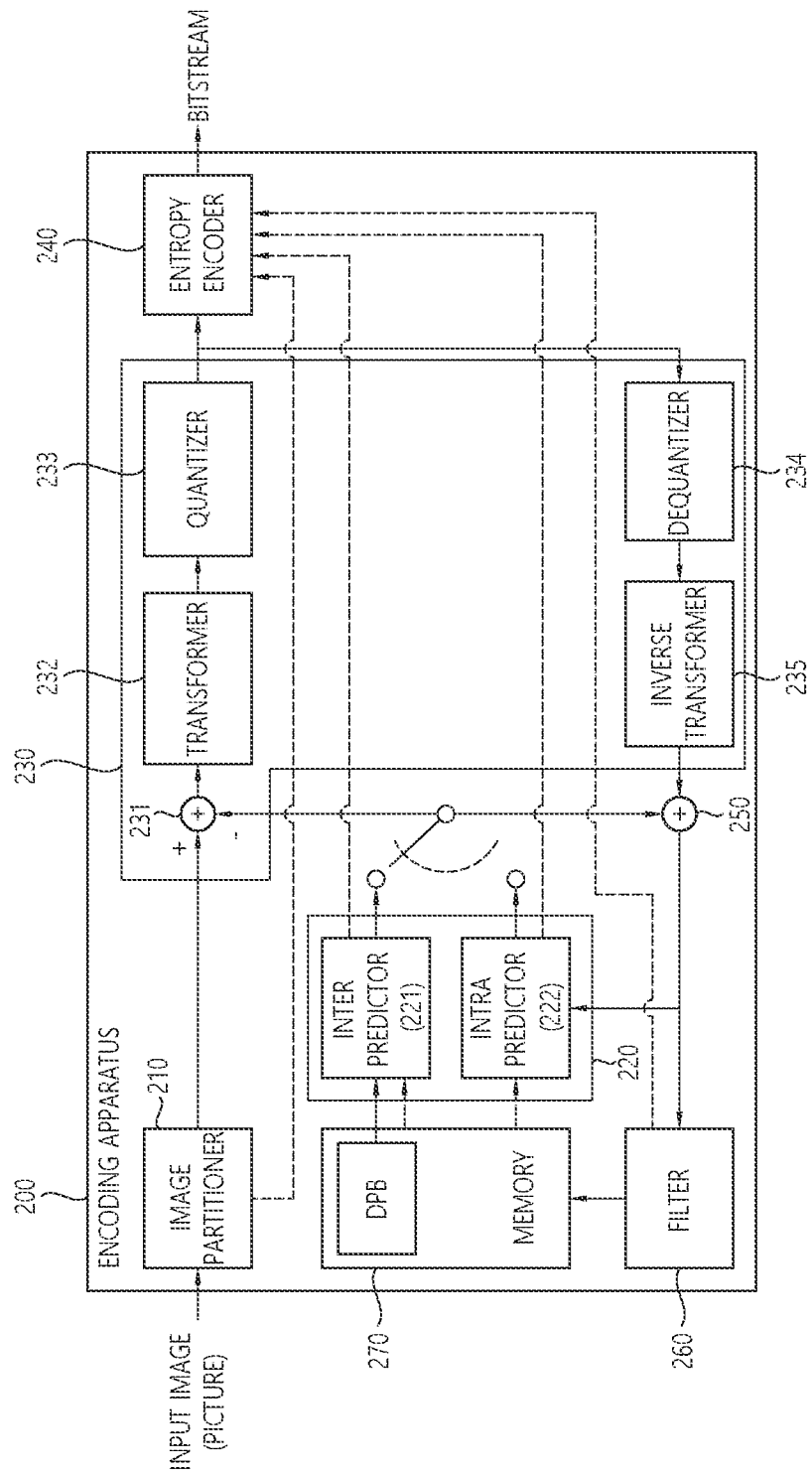
FIG. 2 is a diagram schematically describing a configuration of a video/image encoding apparatus to which embodiments of the present disclosure may be applied.

FIG. 2 is a diagram schematically illustrating a configuration of a video/image encoding apparatus to which the embodiments of the present disclosure may be applied. Hereinafter, what is referred to as the encoding apparatus may include an image encoding apparatus and/or a video encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present document may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The predicted signal generated through the predictor (including the inter predictor 221 and/or the intra predictor 222) may be used to generate a reconstructed signal or used to generate a residual signal. The transformer 232 may generate transform coefficients by applying the transform technique to the residual signal. For example, the transform technique may include at least one of a discrete cosine transform (DCT), a discrete sine transform (DST), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in the present disclosure may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various kinds of filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
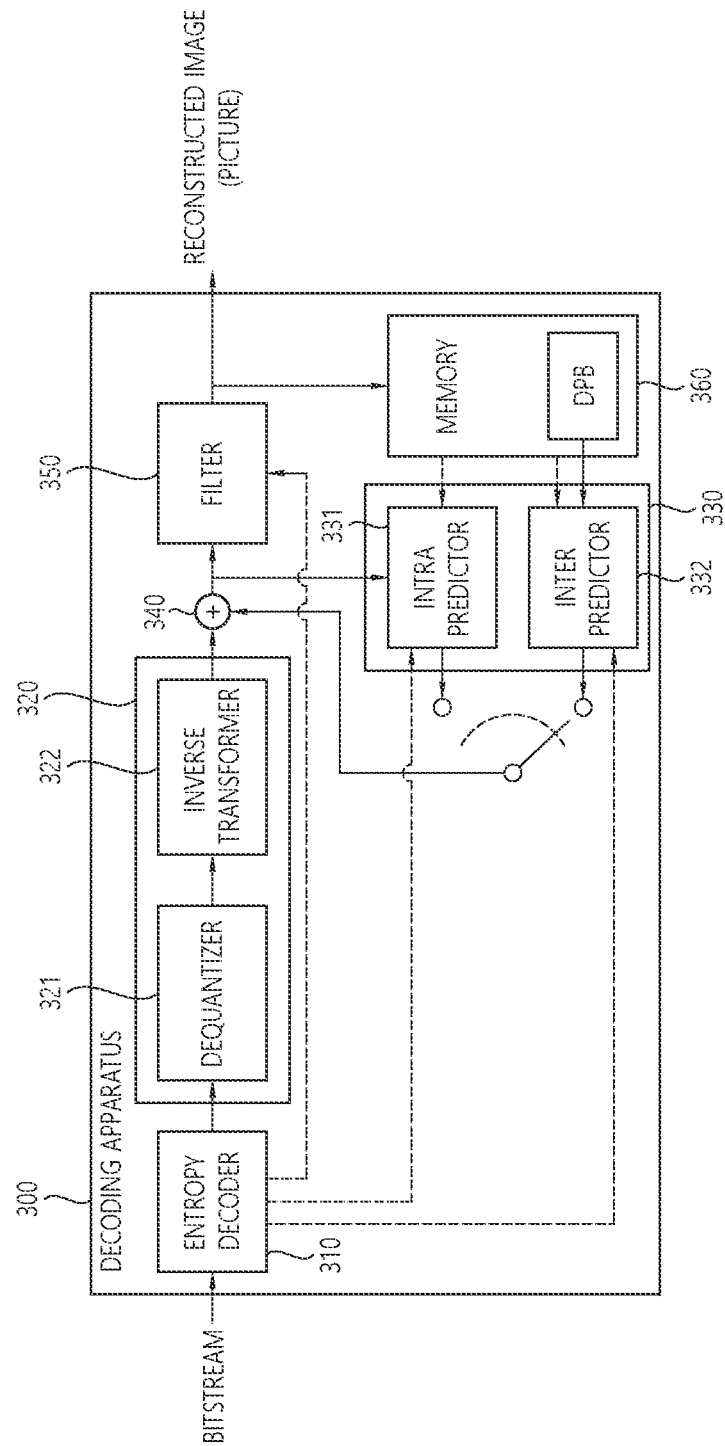
FIG. 3 is a diagram schematically describing a configuration of a video/image decoding apparatus to which embodiments of the present disclosure may be applied.

FIG. 3 is a diagram for schematically explaining a configuration of a video/image decoding apparatus to which the embodiments of the present disclosure may be applied. Hereinafter, what is referred to as the decoding apparatus may include an image decoding apparatus and/or a video decoding apparatus.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in the present disclosure may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, and residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to the present disclosure may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor 330 may determine whether the intra prediction is applied or the inter prediction is applied to the current block based on the information about prediction output from the entropy decoder 310, and determine a specific intra/inter prediction mode.

The predictor 330 may generate the predicted signal based on various prediction methods to be described later. For example, the predictor 330 may not only apply the intra prediction or the inter prediction for the prediction of one block, but also apply the intra prediction and the inter prediction at the same time. This may be called a combined inter and intra prediction (CIIP). Further, the predictor 330 may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 332 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present document, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

As described above, in performing video coding, a prediction is performed to enhance compression efficiency. A predicted block including prediction samples for a current block, that is, a target coding block, may be generated through the prediction. In this case, the predicted block includes the prediction samples in a spatial domain (or pixel domain). The predicted block is identically derived in the encoding apparatus and the decoding apparatus. The encoding apparatus may enhance image coding efficiency by signaling, to the decoding apparatus, information on a residual (residual information) between the original block not an original sample value itself of the original block and the predicted block. The decoding apparatus may derive a residual block including residual samples based on the residual information, may generate a reconstructed including reconstructed samples by adding the residual block and the predicted block, and may generate a reconstructed picture including the reconstructed blocks.

The residual information may be generated through a transform and quantization procedure. For example, the encoding apparatus may derive the residual block between the original block and the predicted block, may derive transform coefficients by performing a transform procedure on the residual samples (residual sample array) included in the residual block, may derive quantized transform coefficients by performing a quantization procedure on the transform coefficients, and may signal related residual information to the decoding apparatus (through a bitstream). In this case, the residual information may include information, such as value information, location information, transform scheme, transform kernel, and quantization parameter of the quantized transform coefficients. The decoding apparatus may perform a dequantization/inverse transform procedure based on the residual information, and may derive residual samples (or residual block). The decoding apparatus may generate a reconstructed picture based on the predicted block and the residual block. Furthermore, the encoding apparatus may derive a residual block by dequantizing/inverse-transforming the quantized transform coefficients for reference to the inter prediction of a subsequent picture, and may generate a reconstructed picture.

In the present document, at least one of the quantization/the dequantization and/or the transform/the inverse transform may be omitted. If the quantization/dequantization is omitted, the quantized transform coefficient may be referred to as a transform coefficient. If the transform/the inverse transform are omitted, the transform coefficient may also be referred to as a coefficient or a residual coefficient, or for unity of expression, also be still referred to as the transform coefficient.

Further, in the present document, the quantized transform coefficient and the transform coefficient may be referred to as a transform coefficient and a scaled transform coefficient, respectively. In this case, the residual information may include information about the transform coefficient(s), and the information about the transform coefficient(s) may be signaled through a residual coding syntax. The transform coefficients may be derived based on the residual information (or the information about the transform coefficient(s)), and the scaled transform coefficients may be derived through the inverse transform (scaling) for the transform coefficients. The residual samples may be derived based on the inverse transform (transform) for the scaled transform coefficients. This may be likewise applied to/expressed in other parts of the present document.

Figure 4:
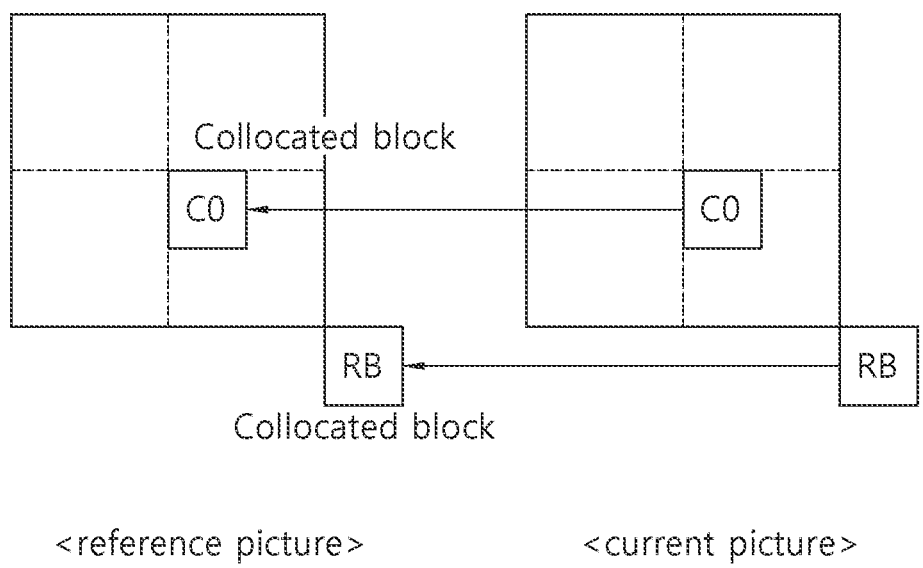
FIG. 4 is a diagram explaining TMVP in detail.

FIG. 4 is a diagram explaining a temporal motion vector predictor (TMVP) in detail.

In inter prediction of the encoding apparatus 200 or the decoding apparatus 300, the TMVP may be included as an MVP candidate or a merge candidate. More specifically, the decoding apparatus 300 may derive a motion information candidate list (e.g., MVP candidate list) based on a spatial neighboring block and/or a temporal neighboring block of a current block, may select one of candidates included in the motion information candidate list based on selection information (e.g., merge index, MVP flag, or MVP index) obtained through a bitstream, and may derive motion information of the current block based on the selected candidate. The decoding apparatus 300 may generate prediction samples based on the derived motion information. Here, for example, the decoding apparatus 300 may derive the selected candidate as an MVP of the current block. Further, the temporal neighboring block may represent a collocated reference block in a reference picture corresponding to the current block, and prediction using the TMVP may represent a prediction method in which a motion vector of the temporal neighboring block is derived as a temporal candidate of the motion information candidate list, and the temporal candidate derived from the motion vector of the collocated reference block is used as the MVP of the current block.

Referring to FIG. 4, a block in a reference picture located on the right-bottom of the current block may be defined as a collocated reference block, and the motion vector of the corresponding block may be used as the TMVP. In this case, if the block on the right-bottom side (RB) is not enabled because the block can be used only for intra prediction, or the block deviates from a picture boundary, a block corresponding to the center location (C0) of the current block may be used as the collocated reference block. Here, the center location may represent a center right-bottom location. That is, in case where four samples are located in the center of the current block, the center location may represent a right-bottom sample location among the four samples. As an example, the RB location may be called ColBr, and the C0 location may be called ColCtr. Meanwhile, a picture including the collocated reference block may be referred to as a collocated reference picture or a collocated reference frame.

Figure 5:
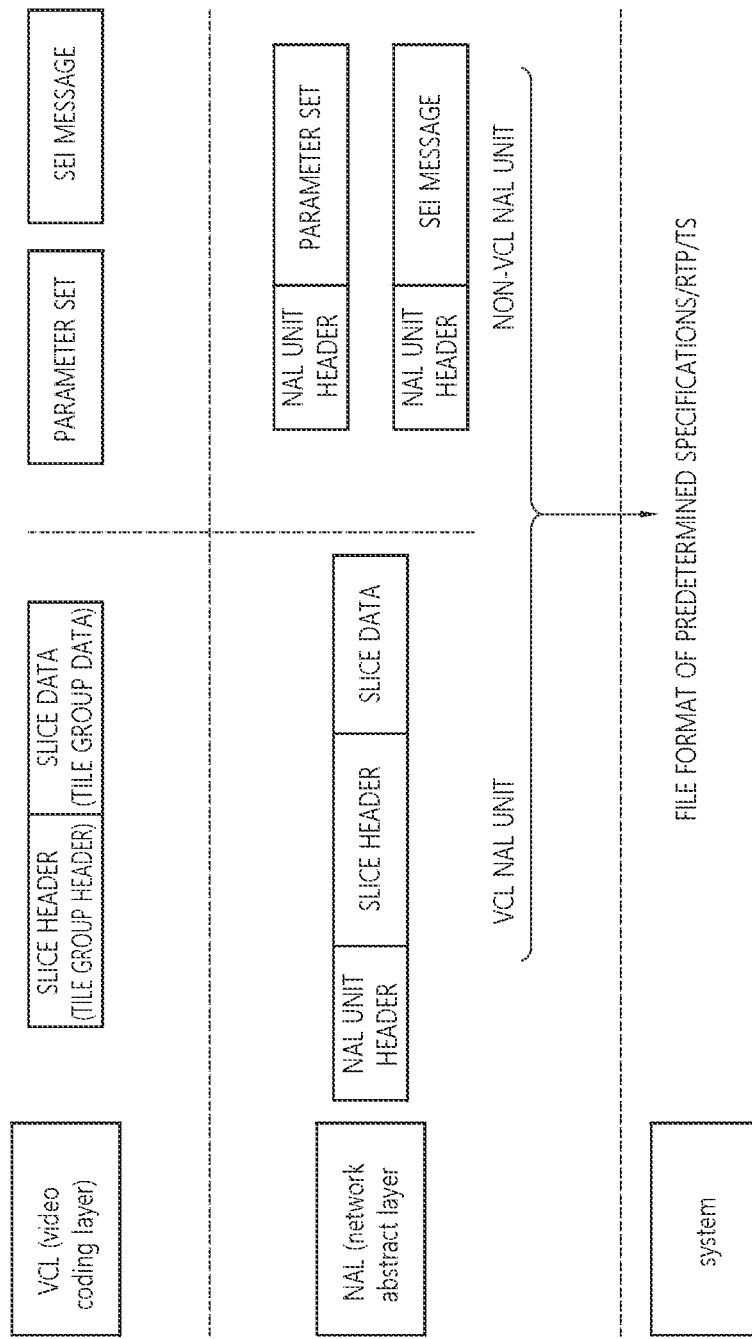
FIG. 5 exemplarily illustrates a hierarchical structure for coded image/video.

FIG. 5 exemplarily shows a hierarchical structure for a coded image/video.

Referring to FIG. 5, the coded image/video is divided into VCL (video coding layer) that deals with an image/video decoding process and itself, a subsystem that transmits and stores the coded information, and a network abstraction layer (NAL) that exists between the VCL and subsystems and is responsible for network adaptation functions.

The VCL may generate VCL data including compressed image data (slice data), or generate parameter sets including a picture parameter set (Picture Parameter Set: PPS), a sequence parameter set (Sequence Parameter Set: SPS), a video parameter set (Video Parameter Set: VPS) etc. or a supplemental enhancement information (SEI) message additionally necessary for the decoding process of an image.

In the NAL, a NAL unit may be generated by adding header information (NAL unit header) to a raw byte sequence payload (RBSP) generated in the VCL. In this case, the RBSP refers to slice data, parameter sets, SEI messages, etc. generated in the VCL. The NAL unit header may include NAL unit type information specified according to RBSP data included in the corresponding NAL unit.

As shown in FIG. 5, the NAL unit may be divided into a VCL NAL unit and a Non-VCL NAL unit according to the RBSP generated in the VCL. The VCL NAL unit may mean a NAL unit including information (sliced data) about an image, and the Non-VCL NAL unit may mean a NAL unit containing information (parameter set or SEI message) necessary for decoding an image.

The above-described VCL NAL unit and Non-VCL NAL unit may be transmitted through a network by attaching header information according to a data standard of the subsystem. For example, the NAL unit may be transformed into a data form of a predetermined standard such as H.266/VVC file format, Real-time Transport Protocol (RTP), Transport Stream (TS), etc. and transmitted through various networks.

As described above, in the NAL unit, the NAL unit type may be specified according to the RBSP data structure included in the corresponding NAL unit, and information on this NAL unit type may be stored and signaled in the NAL unit header.

For example, the NAL unit may be roughly classified into the VCL NAL unit type and the Non-VCL NAL unit type depending on whether the NAL unit includes information about the image (slice data). The VCL NAL unit type may be classified according to property and a type of a picture included in the VCL NAL unit, and the Non-VCL NAL unit type may be classified according to the type of a parameter set.

The following is an example of a NAL unit type specified in accordance with the property and kind of a picture included in the VCL NAL unit.

TSA (Temporal Sub-layer Access): Type for a NAL unit including a coded slice segment of a TSA picture. Here, the TSA picture is a picture in which switching between temporal sub-layers is possible in the bitstream supporting temporal scalability, and is a picture indicating a location where up-switching from a lower sub-layer to an upper sub-layer is possible.

STSA (Step-wise Temporal Sub-layer Access): Type for a NAL unit including a coded slice segment of an STSA picture. Here, the STSA picture is a picture in which switching between temporal sub-layers is possible in the bitstream supporting temporal scalability, and is a picture indicating a location where up-switching from a lower sub-layer to an upper sub-layer that is one step higher than the lower sub-layer is possible.

TRAIL: non-TSA, Type for a NAL unit including a coded slice segment of a non-STSA trailing picture. Here, the trailing picture means a picture following the picture of which random access is possible in an output order and in a decoding order.

IDR (Instantaneous Decoding Refresh): Type for a NAL unit including a coded slice segment of an IDR picture. Here, the IDR picture is a picture of which random access is possible, and may be the first picture in the decoding order in the bitstream, or may appear in the middle of the bitstream. Further, the IDR picture includes only I slice. Each IDR picture is the first picture of a coded video sequence (CVS) in the decoding order. If the IDR picture has correlation with a decodable leading picture to be described later, the NAL unit type of the IDR picture may be represented as IDR_W_RADL, whereas if the IDR picture does not have correlation with the leading picture, the NAL unit type of the IDR picture may be represented as IDR_N_LP. The IDR picture does not have correlation with a non-decodable leading picture to be described later.

CRA (Clean Random Access): Type for a NAL unit including a coded slice segment of a CRA picture. Here, the CRA picture is a picture of which random access is possible, and may be the first picture in the decoding order in the bitstream, or may appear in the middle of the bitstream. Further, the CRA picture includes only I slice. The CRA picture may have correlation with a decodable leading picture or a leading picture that can skip decoding, and may not make an output for the leading picture that can skip the decoding. Since the leading picture that can skip the decoding may use a picture that is not present in the bitstream as a reference picture, the leading picture that can skip the decoding may not be output by the decoder.

BLA (Broken Link Access): Type for a NAL unit including a coded slice segment of a BLA picture. Here, the BLA picture is a picture of which random access is possible, and may be the first picture in the decoding order in the bitstream, and may appear in the middle of the bitstream. Further, the BLA picture includes only I slice. Each BLA picture starts a new coded video sequence (CVS), and the same decoding process as that of the IDR picture may be performed. If the BLA picture has correlation with the leading picture that can skip the decoding, the NAL unit type of the BLA picture may be represented as BLA_W_LP, whereas if the BLA picture has correlation with a decodable leading picture, the NAL unit type of the BLA picture may be represented as BLA_W_LP. If the BLA picture does not have correlation with the leading picture that can skip the decoding, but has the correlation with the decodable leading picture, the NAL unit type of the BLA picture may be represented as BLA_W_RADL. If the BLA picture does not correlation with the leading picture, the NAL unit type of the BLA picture may be represented as BLA_N_LP.

The following is an example of the NAL unit type specified according to the type of parameter set included in the Non-VCL NAL unit type.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

PH (Picture header) NAL unit: Type for NAL unit including PH

The above-described NAL unit types have syntax information for the NAL unit type, and the syntax information may be stored and signaled in the NAL unit header. For example, the syntax information may be nal_unit_type, and NAL unit types may be specified by a nal_unit_type value.

In this regard, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. For example, one picture may be composed of different types of slices including intra coded slices (namely, I-slices) and/or inter coded slices (namely, P-slices and B-slices). In this case, a picture header may include information/parameters applied to intra coded slices and inter coded slices. Alternatively, one picture may be composed of one type of slice.

The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to the entire video. The DPS may include information/parameters related to concatenation of a coded video sequence (CVS). In this document, high level syntax (HLS) may include at least one of the APS syntax, PPS syntax, SPS syntax, VPS syntax, DPS syntax, picture header syntax, and slice header syntax.

In this document, the image/video information encoded in the encoding apparatus and signaled in the form of a bitstream to the decoding apparatus may include, as well as picture partitioning-related information in the picture, intra/inter prediction information, residual information, in-loop filtering information, etc. the information included in the slice header, the information included in the picture header, the information included in the APS, the information included in the PPS, the information included in the SPS, the information included in the VPS, and/or the information included in the DPS. In addition, the image/video information may further include information of the NAL unit header.

Meanwhile, the bitstream supporting temporal scalability (or temporal scalable bitstream) includes information on a temporal layer being temporally scaled. The information on the temporal layer may be identification information of a specified temporal layer in accordance with the temporal scalability of the NAL unit. For example, the identification information of the temporal layer may use temporal_id syntax information, and the temporal_id syntax information may be stored in a NAL unit header by the encoding apparatus, and may be signaled to the decoding apparatus. Hereinafter, in the present specification, the temporal layer may be called a sub-layer, temporal sub-layer, or a temporal scalable layer.

Figure 6:
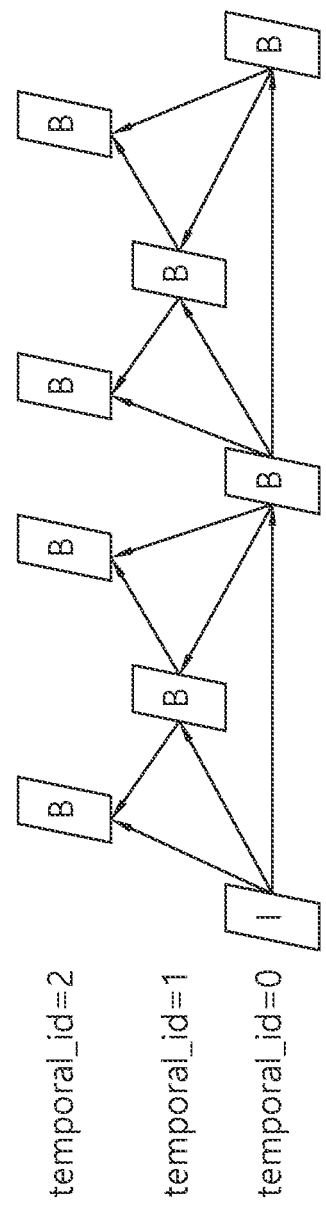
FIG. 6 is a diagram illustrating a temporal layer structure for NAL units in a bitstream supporting time scalability.

FIG. 6 is a diagram illustrating a temporal layer structure for NAL units in the bitstream supporting temporal scalability.

If the bitstream supports temporal scalability, NAL units included in the bitstream have identification information (e.g., temporal_id) of the temporal layer. As an example, the temporal layer composed of NAL units having the temporal_id value of 0 may provide the lowest temporal scalability, and the temporal layer composed of NAL units having the temporal_id value of 2 may provide the highest temporal scalability.

In FIG. 6, a box inscribed by I means I picture, and a box inscribed by B means B picture. Further, an arrow represents a reference relationship for whether a picture refers to another picture.

As illustrated in FIG. 6, the NAL units of the temporal layer having the temporal_id value of 0 are reference pictures to which the NAL units of the temporal layer having the temporal_id value of 0, 1, or 2 can refer. The NAL units of the temporal layer having the temporal_id value of 1 are reference pictures to which the NAL units of the temporal layer having the temporal_id value of 1 or 2 can refer. The NAL units of the temporal layer having the temporal_id value of 2 are reference pictures to which the NAL units of the same temporal layer, that is, the temporal layer having the temporal_id value of 2, can refer, or may be unreferenced pictures to which other pictures do not refer.

As illustrated in FIG. 6, if the NAL units of the temporal layer having the temporal_id value of 2, that is, the NAL units of the uppermost temporal layer, are unreferenced pictures, the NAL units may be extracted (or removed) from the bitstream without exerting an influence on other pictures in the decoding process.

Meanwhile, the IDR, CRA, and BLA types among the NAL unit types as described above are information representing the NAL unit including a picture of which random access (or splicing) is possible, that is, a random access point (RAP) or intra random access point (TRAP) picture becoming the random access point. In other words, the IRAP picture may be the IDR, CRA, or BLA picture, and may include only I slice. In the decoding order in the bitstream, the first picture becomes the IRAP picture.

If the TRAP picture (IDR, CRA, or BLA picture) is included in the bitstream, a pictures preceding the IRAP picture in an output order but following the TRAP picture in the decoding order may be present. Such pictures may be referred to as leading pictures (LPs).

Figure 7:
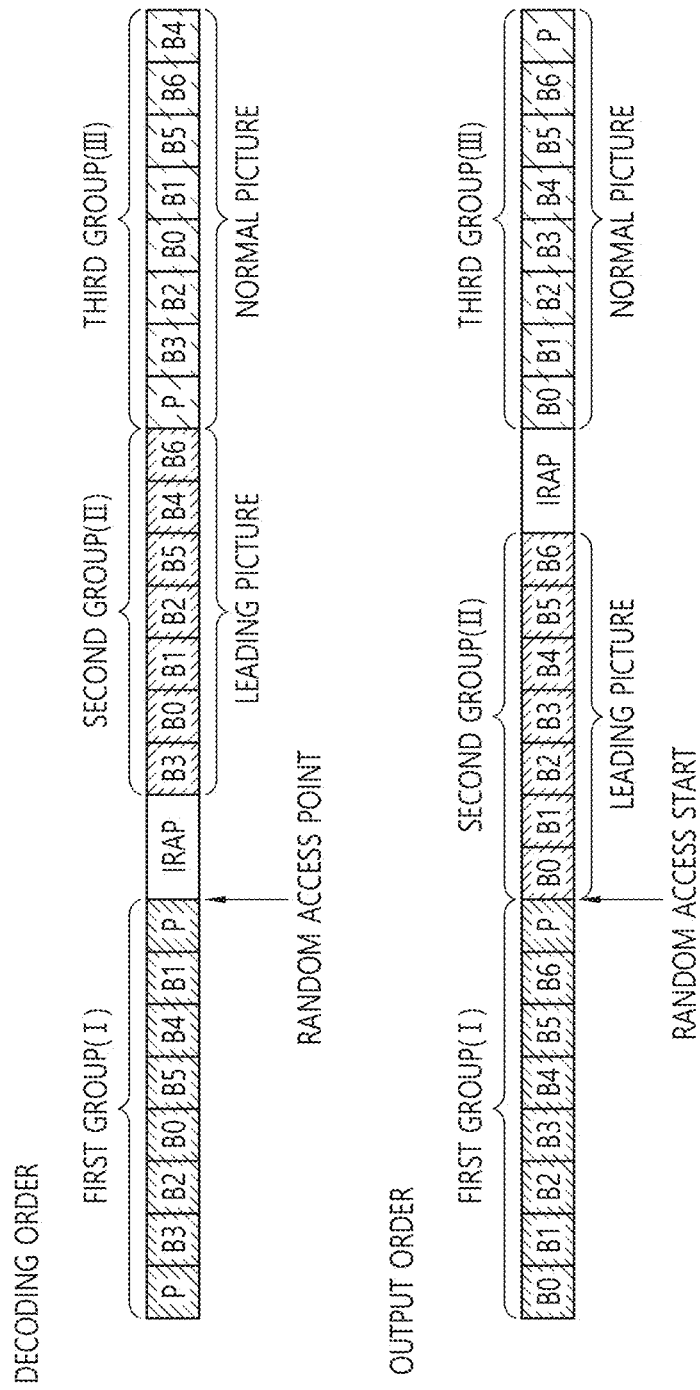
FIG. 7 is a diagram explaining a picture of which random access is possible.

FIG. 7 is a diagram explaining a picture of which random access is possible.

The picture of which the random access is possible, that is, the RAP or IRAP picture becoming the random access point, is the first picture in the decoding order in the bitstream during the random access, and includes only I picture.

In FIG. 7, the output order (or display order) and the decoding order of pictures are illustrated. As illustrated, the output order and the decoding order of the pictures may differ from each other. For convenience in explanation, the pictures are classified into specific groups.

The pictures belonging to a first group (I) represent pictures preceding the IRAP picture in the output order and the decoding order in all, and the pictures belonging to a second group (II) represent pictures preceding the IRAP picture in the output order and following the IRAP picture in the decoding order. The pictures of a third group (III) follow the IRAP picture in the output order and the decoding order in all.

The pictures of the first group (I) may be decoded and output regardless of the IRAP picture.

The pictures belonging to the second group (II), which are output preceding the IRAP picture may be called leading pictures, and the leading pictures may cause a problem in the decoding process in case that the IRAP picture is used as the random access point.

The picture belonging to the third group (III), which follows the IRAP picture in the output order and in the decoding order, is called a normal picture. The normal picture is not used as the reference picture of the leading picture.

In the bitstream, the random access point at which the random access occurs becomes the IRAP picture, and the random access starts as the first picture of the second group (II) is output.

Figure 8:
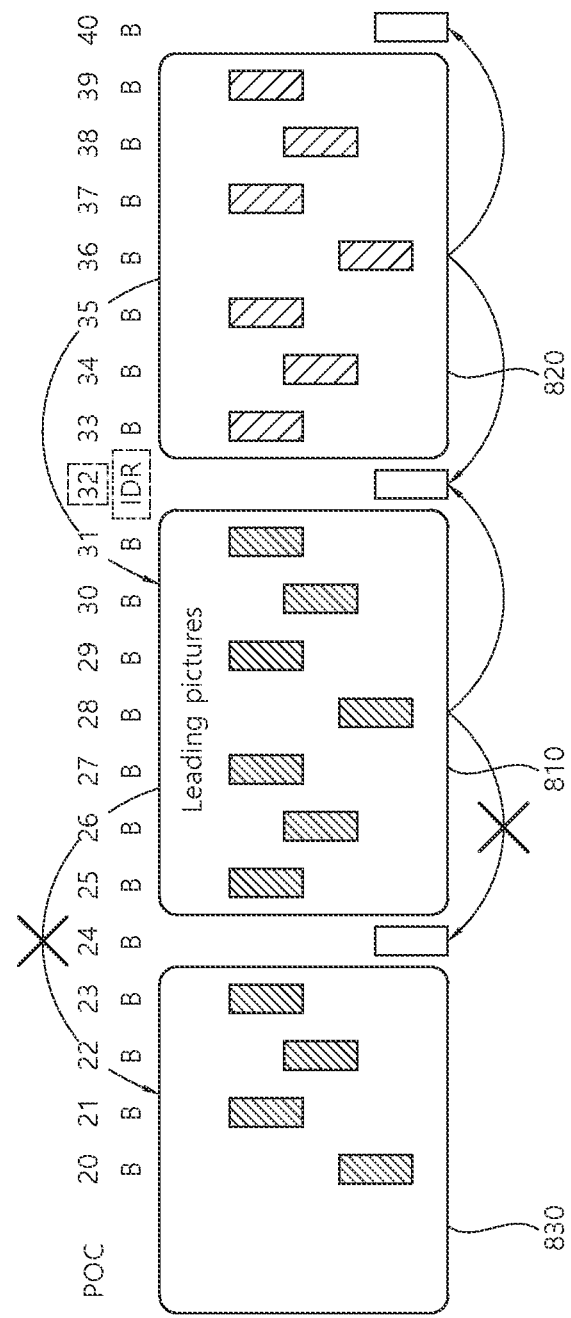
FIG. 8 is a diagram explaining an IDR picture.

FIG. 8 is a diagram explaining an IDR picture.

The IDR picture is a picture that becomes a random access point in case that the group of pictures has a closed structure.

Since the IDR picture is the IRAP picture as described above, the IDR picture includes only I slice, and may be the first picture in the decoding order in the bitstream, or may be in the middle of the bitstream. If the IDR picture is decoded, all reference pictures that are stored in a decoded picture buffer (DPB) are indicated as "unused for reference".

A bar illustrated in FIG. 8 represents a picture, and an arrow represents a reference relationship for whether a picture can use another picture as a reference picture. The "x" mark presented on the arrow represents that the corresponding picture(s) cannot refer to the picture indicated by the arrow.

As illustrated, the picture in which POC is 32 is the IDR picture. The pictures in which the PCO is 25 to 31 and which are output preceding the IDR picture are leading pictures 810. The pictures in which the POC is equal to or larger than 33 correspond to normal pictures 820.

The leading pictures 810 preceding the IDR picture in the output order may use the leading picture that is different from the IDR picture as the reference picture, but are unable to use the past picture 830 preceding the leading pictures 810 in the output order and in the decoding order.

The normal pictures 720 following the IDR picture in the output order and in the decoding order may be decoded with reference to the IDR picture, the leading picture, and other normal pictures.

Figure 9:
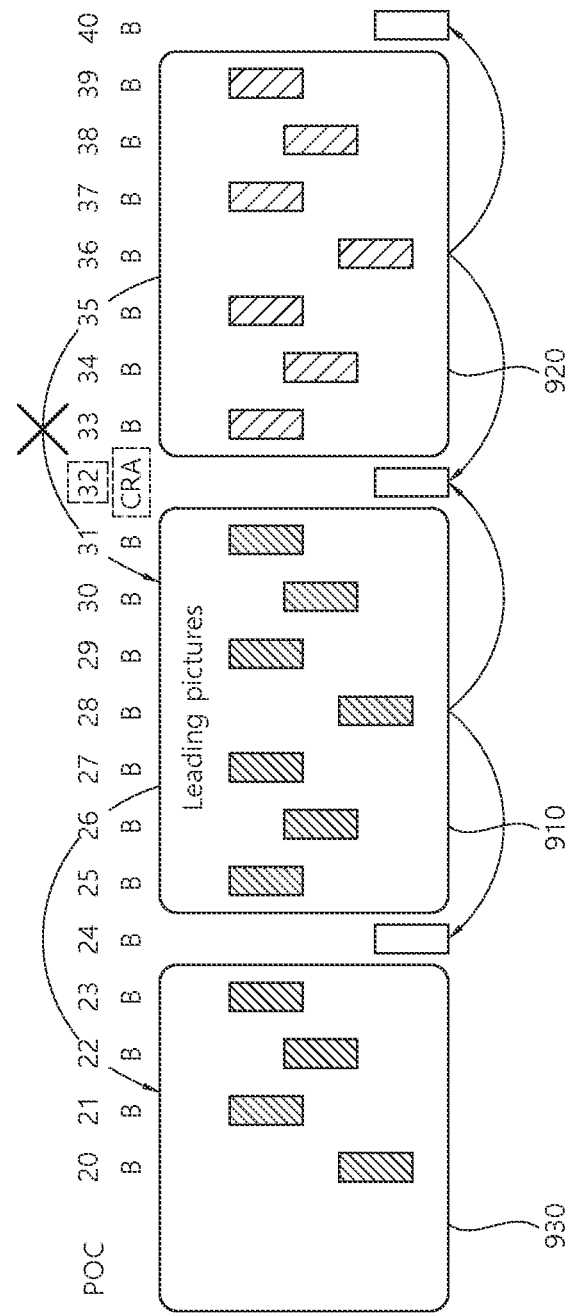
FIG. 9 is a diagram explaining a CRA picture.

FIG. 9 is a diagram explaining a CRA picture.

The CRA picture is a picture that becomes a random access point in case that the group of pictures has an open structure. As described above, since the CRA picture is also the IRAP picture, the CRA picture includes only I slice, and may be the first picture in the decoding order in the bitstream, or may be in the middle of the bitstream for a normal playback.

A bar illustrated in FIG. 9 represents a picture, and an arrow represents a reference relationship for whether a picture can use another picture as a reference picture. The "x" mark presented on the arrow represents that the corresponding picture or pictures cannot refer to the picture indicated by the arrow.

The leading pictures 910 preceding the CRA picture in the output order may use all of the CRA picture, other leading pictures, and the past picture 930 preceding the leading pictures 910 in the output order and in the decoding order as a reference picture.

In contrast, the normal pictures 920 following the CRA picture in the output order and in the decoding order may be decoded with reference to other normal pictures different from the CRA picture. The normal pictures 920 may not use the leading pictures 910 as the reference picture.

The BLA picture has similar function and property to those of the CRA picture, and if the coded picture is spliced or the bitstream is cut in the middle, the BLA picture means a picture that is present in the middle of the bitstream as a random access point. However, the BLA picture is considered as the start of a new sequence when the random access occurs, and thus, unlike the CRA picture, when the BLA picture is received in the decoder, parameter information on an image can be received in all again.

The BLA picture may be determined by the encoding apparatus, and the system having received the bitstream from the encoding apparatus may change the CRA picture to the BLA picture. For example, when the bitstream is spliced, the system provides the image to the decoder that decodes the image by changing the CRA picture to the BLA picture, and in this case, the parameter information on the image is also provided newly from the system to the decoder. In the present document, the decoder means a device including an image processor that decodes the image, and may be implemented by the decoding apparatus of FIG. 3, and may mean a decoding module that is a core module processing the image.

Meanwhile, a signaling example at an existing sequence parameter set (SPS) level related to the TMVP may be as in Table 1 below. The syntax of Table 1 below may be a part of the SPS.

TABLE 1

| | Descriptor |
|---|---|
| seq_parameter_set_rbsp( ) { | |
| ... | |
| sps_temporal_mvp_enabled_flag | ud(1) |
| ... | |
| } | |

Here, semantics of a syntax element included in the syntax of Table 1 above may be represented, for example, as in Table 2 below.

TABLE 2

| sps_temporal_mvp_enabled_flag equal to 1 specifies that temporal motion vector predictors may be used in the CLVS. sps_temporal_myp_enabled_flag equal to 0 specifies that temporal motion vector predictors are not used in the CLVS. |
|---|

The sps_temporal_mvp_enabled_flag syntax element may represent whether the TMVP is used for the CLVS based on whether the value thereof is 0 or 1. That is, the sps_temporal_mvp_enabled_flag syntax element may represent whether the TMVP is used in the pictures in the CLVS. The sps_temporal_mvp_enabled_flag syntax element may be called a first TMVP enabled flag, and may be signaled through the SPS.

If it is determined that the TMVP is enabled for the pictures in the CLVS referring to the SPS based on the sps_temporal_mvp_enabled_flag syntax element, the picture header or slice header may check a related picture or slice, and may detect a picture to be used as a collocated reference picture.

For example, if the value of the sps_temporal_mvp_enabled_flag syntax element is 1, it may be determined that the TMVP is enabled for the pictures in the CLVS, and in this case, the signaling example at the picture header level of the pictures in the CLVS may be as in Table 3 below. The syntax of Table 3 below may be a part of the picture header.

TABLE 3

| | Descriptor |
|---|---|
| picture_header_rbsp( ) { | |
| ... | |
| if( sps_temporal_mvp_enabled_flag) | |
| pic_temporal_myp_enabled_flag | u(1) |
| ... | |
| } | |

Here, semantics of the syntax element included in the syntax of Table 3 above may be represented, for example, as in Table 4 below.

TABLE 4 pic_temporal_mvp_enabled_flag specifies whether temporal motion vector predictors can be used for inter prediction for slices associated with the PH, if pic_temporal_myp_enabled_flag is equal to 0, the syntax elements of the slices associated with the PH shall be constrained such that no temporal motion vector predictor is used in decoding of the slices. Otherwise (pic_temporal_mvp_enabled_flagis equal to 1), temporal motion vector predictors maybe used in decoding of the slices associated with the PH. When not present, the value of pic_temporal_mvp_enabled_flag is inferred to be equal to 0. When no reference picture in the DPB has the same spatial resolution as the current -picture, the- value of pic_temporal_mvp_enabled_flag shall be equal to: 0.

That is, the pic_temporal_mvp_enabled_flag syntax element may represent whether the TMVP is used for inter prediction of slices related to the picture header based on whether the value thereof is 0 or 1. The pic_temporal_mvp_enabled_flag syntax element may be called a second TMVP enabled flag, and may be signaled through the picture header.

If it is determined that the TMVP is enabled for the slices related to the picture header based on the pic_temporal_mvp_enabled_flag syntax element, the slice header may check the related slice, and may detect the picture to be used as the collocated reference picture.

For example, if the value of the pic_temporal_mvp_enabled_flag syntax element is 1, it may be determined that the slices related to the picture header are enabled, and in this case, the signaling example at the slice header level of the information related to the collocated reference picture for the TMVP may be as in Table 5 below. The syntax of Table 5 may be a part of the slice header.

TABLE 5

|  | Descriptor |
|---|---|
| slice_header() { <br> ... <br>   if pis_rpl_present_flag \|\| ( ( nal_unit_type != IDR_W_RADL && nal_unit_type != <br>       IDR_N_LP ) \|\| sps_idr_rpl_present_flag ) ) { <br>     if( ( slice_type != I && num_ref_entries[ 0 ][ RplsIdx[ 0 ] ] > 1) \|\| <br>       ( slice_type == B && num_ref_entries[ 1 ][ RplsIdx[ 1 ] ] > 1 ) ) { <br>       num_ref_idx_active_override_flag |  u(1) |
|       if( num_ref_idx_active_override_flag) <br>         for( i = 0; i < (slice_type == B ? 2: 1 ); i++ ) <br>           if( num_ref_entries[ i ][ RplsIdx[ i ] ] >1 ) <br>             num_ref_idx_active_minus1[ i ] | ue(v) |
|     } <br>   } <br>   if( slice_type != 1) { <br>   ... <br>     if( pic_temporal_mvp_enabled_flag ) { <br>       if( slice_type == B && !pps_collocated_from_10_idc ) <br>         collocated_from_10_flag | u(1) |
|       if( ( collocated_from_10_flag && NumRefIdxActive[ 0 ] > 1 ) \|\| <br>         ( !collocated_from_10_flag && NumRefIdxActive[ 1 ] > 1 ) ) <br>         collocated_ref_idx | ue(v) |
|     } <br>     ... <br>   } <br>   ... <br> } |  |

Here, semantics of the syntax element included in the syntax of Table 5 above may be represented, for example, as in Table 6 below.

TABLE 6 num_ref_idx_active_override_flag equal to 1 specifies that the syntax element num_ref_idx_active_minus1[ 0 ] is presemt for P and B slices and that the =ymax element num_res_idx_active_minus1[ 1 ] is present for B slices num_ref_idx_active_override_flag equal to 0 specifies that the syntax elements num_ref_idx_active_minusi[ 0 ] and num_refix_actire_minus![ 1 ]are not present. When not present the value of num_ref_idx_active_override_flag is inferred to be equal to 1.
num_ref_idx_active_minusl[ i ] is used for the derivation of the variable NumRefIdxActive[ i ] as specified by Equation 7-110. The value ofnum_ref_idxactive_minusi[ i ] shall be in the range of 0 to 14, inclusive.
For i equal to 0 or 1, when the current slice is a B slice, num_ref_idx_active_override_flag is equal to 1, and nim_ref_idxa_ctive_minusi[ i ] is not present, num_ref_idx_active_minus1[ i ] is inferred to be equal to 0.
Whe the current slice is a P slice, num_ref_idx_active_overide_flag is equal to 1, and num_ref_idx_active_minus1[ 0 ] is not present, num_ref_idx_actve_minus1[ 0 ] is inferred to be equal to 0
The variable NumRefIdxActive[ i ] is derived as follows:
    for (i = 0; i < 2; i++ ) {
        if( slice_type == B \|\| ( slice_type == P && i == 0 ) ) {
            if( num_ref_idx_active_overrde_flag)
                NumRefIdxActive[ i ] = num_ref_idx_active_minus1[ i ] + 1     (7-110)

TABLE 6-continued

```
    else {
      if( num_ref_entries[ i ][ RplsIdx[ i ] ] >= num_ref_idx_default_active_minus1[ i ] + 1
        NumRefIdxActive[ i ] = num_ref_idx_default_active_minus1[ i ] + 1
      else
        NumRefIdxActive[ i ] = num_ref_entries[ i ][RpisIdx[ i ] ]
    }
  } else // slice_type = = I | | ( slice_type = = P && i == 1)
    NumRefIdxActive[ i ] = 0
}
```
The value of NumRefIdxActive[ i ] − 1 specifies the maximum reference index for reference picture list i that may
be used to decode the slice. When the value of NumRefIdxActive[ i ] is equal to 0, no reference index for reference
picture list i may be used to decede the slice
When the current slice is a P slice, the valve of NumRefIdxActive[ 0 ] shall be greater than 0.
When the current slice is a B slice both NumRefIdxActive[ 0 ] and NumRefIdxActive[ 1 ] shall be greatet than 0.
collocated_from_l0_flag equal to 1 specifies that the collocated picture used for temporal motion vector prediction
is derived from reference picture list 0. collocated_from_l0_flag equal to 0 specifies that: the collocated picture used
for temporal motion vector prediction is derived from reference picture list 1.
When collocated_from_l0_flag is not present, the following applies:
If slice_type is not equal to B, the value of collocated_from_l0_flag is inferred to be equal to 1.
Otherwise (slice_type is equal to B), the value of collocated_from_l0_flag is inferred to be equal to
pps_collocated_from_l0_idc − 1.
collocated_ref_ idx specifies the reference index of the collocated picture used for temporal motion vector
prediction.
When slice_type is equal to P or when slice_type is equal to B and collocated_from_l0_flag is equal to 1,
collocated_ref_idx refers to a picture in list 0. and the value of collocated_ref_idx shall be in the range of 0 to
NumRefIdxActive[ 0 ] − 1, inclusive.
When slice_type is equal to B and collocated_from_l0_flag is equal to 0, collocated_ref_idx refers to a picture in list
1, and the value of collocated_ref_idx shall be in the range of 0 to NumRefIdxActive[ 1 ] − inclusive.
When collocated_ref_idx is not present, the value of collocated_ref_idx is inferred to be equal to 0.
It is a requirement of bitstream conformance that the picture referred to by collocated_ref_idx shall be the same for
all slices of a coded picture.
It is a requirement of bitstream conformance that the resolutions or the reference picture referred to by
collocated_ret_idx and the current picture shall be the same and
RefPicIsScaled[ collocated_from_l0_flag ? 0 : 1 ][ collocated_ref_idx ] shall he equal to 0.

That is, the num_ref_idx_active_override_flag syntax element may represent whether the num_ref_idx_active_minus1 [0] syntax element is present for P and B slices and whether the num_ref_idx_active_minus1 [1] syntax element is present for B slices based on whether the value thereof is 0 or 1. The num_ref_idx_active_override_flag syntax element may be signaled through the slice header.

The value of the num_ref_idx_active_minus1[i] syntax element of +1 may be used to derive a variable NumRefIdxActive[i]. The num_ref_idx_active_minus1[i] syntax element may be signaled through the slice header. Here, the value of the NumRefIdxActive[i] of −1 may mean the maximum reference index value of the reference picture list i. That is, the value of the NumRefIdxActive[i] may means the number of pictures being present in the reference picture list i.

The collocated_from_l0_flag syntax element may represent whether the collocated reference picture used for the TMVP is derived from reference picture list 0 based on whether the value thereof is 0 or 1. For example, if the value of the collocated_from_l0_flag syntax element is 1, the collocated reference picture used for the TMVP may be derived from reference picture list 0, and if the value of the collocated_from_l0_flag syntax element is 0, the collocated reference picture used for the TMVP may be derived from reference picture list 1. For example, if the collocated_from_l0_flag syntax element is not present, the value of the collocated_from_l0_flag syntax element may be derived as 1, and the collocated_from_l0_flag syntax element may be signaled through the slice header.

The collocated_ref_idx syntax element may represent a reference index value of the collocated reference picture used for the TMVP. As an example, if the slice type (slice_type) is P, or the slice type is B, and the value of the collocated_from_l0_flag is 1, the collocated_ref_idx syntax element may be determined based on reference picture list 0. IN this case, the value of the collocated_ref_idx syntax element may be equal to or larger than 0 and equal to or smaller than the NumRefIdxActive[i]. As another example, if the slice type is B, and the value of the collocated_from_l0_flag is 0, the collocated_ref_idx syntax element may be determined based on reference picture list 1. In this case, the value of the collocated_ref_idx syntax element may be equal to or larger than 0 and equal to or smaller than the NumRefIdxActive[i]. The collocated_ref_idx syntax element may be signaled through the slice header.

For example, if the value of the pic_temporal_mvp_enabled_flag is 1, the collocated_from_l0_flag may be included in the slice header. Further, for example, based on the collocated_from_l0 flag, the collocated_ref_idx may be included in the slice header. In this case, based on the collocated_ref_idx, the collocated reference picture for the current picture may be derived.

Meanwhile, the picture may be included in different NAL unit types. Here, that the picture is included in the different NAL unit types may mean that the picture includes slices having the different NAL unit types. For example, in order to generate a new picture for a new bitstream, one or more subpictures corresponding to the first bitstream may be merged with one or more subpictures corresponding to the second bitstream. The subpictures corresponding to the first bitstream may include slices encapsulated in other type NAL units.

Figure 10:
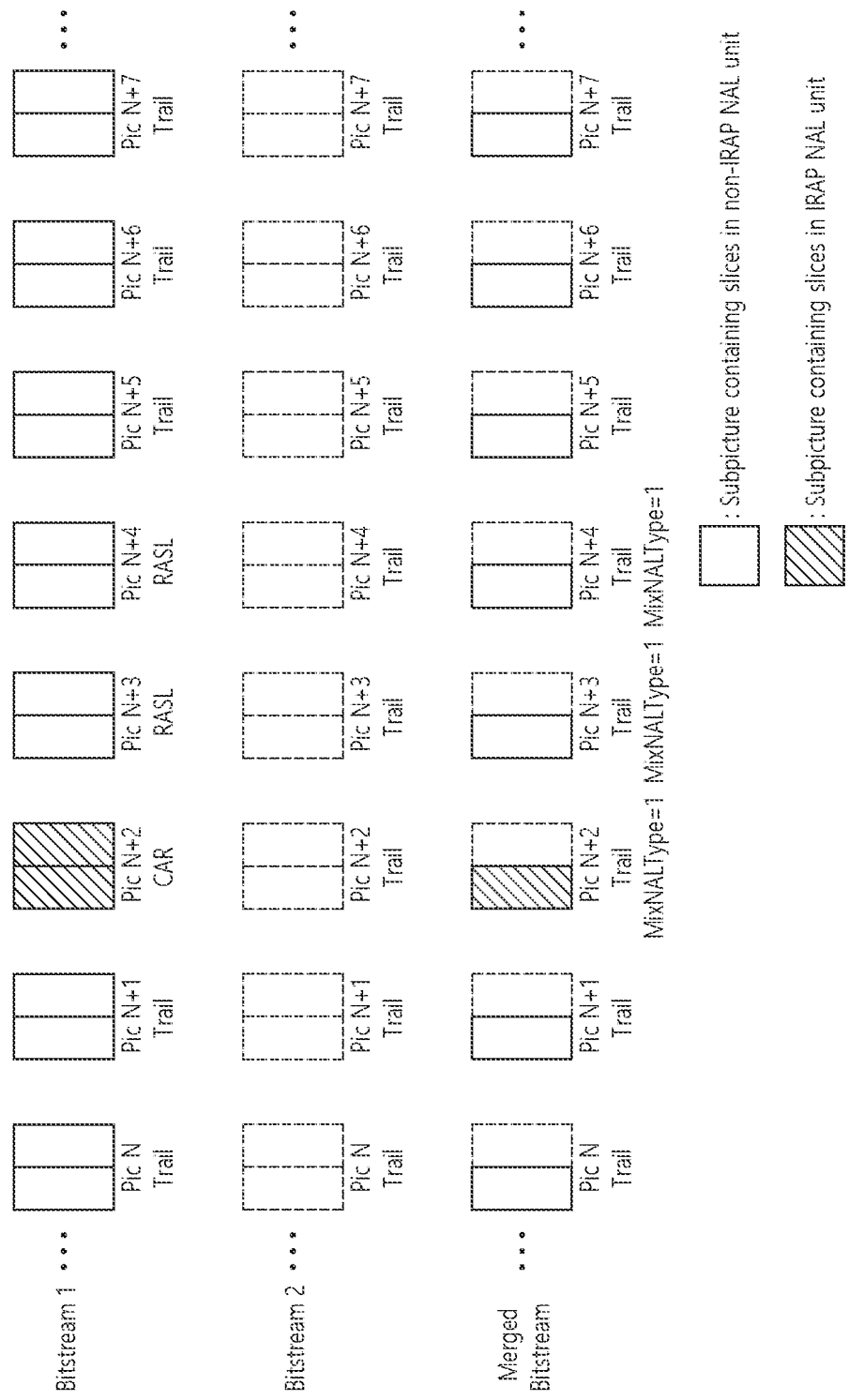
FIG. 10 is a diagram exemplarily illustrating bitstream merge.

FIG. 10 is a diagram exemplarily illustrating bitstream merge.

For example, referring to a merged bitstream of FIG. 10, one picture may include slices having a trail type that is one NAL unit type, such as pictures N, N+1, N+5, N+6, and N+7, and may include slices having a CRA and trail type that is a merged NAL unit type such as picture N+2, and may include slices having an RASL and trail type that is a merged NAL unit type such as pictures N+3 and N+4. That is, pictures N+2, N+3, and N+4 may include slices having different NAL unit types. As described above, the picture referring to a picture parameter set (PPS), in which the value of the mixed_nalu_types_in_pic_flag syntax element is 1, may have a merged MAN unit type that is a different type. Here, the mixed_nalu_types_in_pic_flag syntax element may specify whether a plurality of VCL-NAL units for the corresponding picture do not have the same NAL unit type.

In relation to this, the TMVP application may have the following problem.

If the TMVP is enabled for the current picture, all slices in the current picture are limited to use the same reference picture as the collocated reference picture for the TMVP. However, as an example, if the current picture is a following picture that follows the picture N+2 that is the IRAP (CRA) picture in bitstream 1 of FIG. 10, the current picture will be unable to use the pictures preceding the picture N+2 as the collocated reference picture for the current picture. Meanwhile, if the current picture is a following picture that follows the picture N+2 in bitstream 2 of FIG. 10, the current picture will be able to use the pictures preceding the picture N+2 as the collocated reference picture for the current picture. That is, if the current picture follows the IRAP picture, the current picture is unable to use the pictures preceding the IRAP picture as the collocated reference picture for the current picture, and if the current picture follows the NON-IRAP picture, the current picture is unable to use the pictures preceding the IRAP picture as the collocated reference picture for the current picture. In this case, the slices in the picture corresponding to the merged bitstream of FIG. 10 will be unable to follow the limit to use the same reference picture as the collocated reference picture for the TMVP. That is, it is necessary to limit the picture to be used as the collocated reference picture by identifying the type of NAL unit of the slices in the picture so that the slices in the picture is able to refer to the same reference picture as the collocated reference picture for the TMVP.

Further, in applying the TMVP, the decoder may have a buffer for storing motion vector field (MVP) information. Here, the buffer may be called a motion vector field buffer, a motion vector field storage, a motion field storage, an MVP buffer, and an MVP storage. The buffer may include a motion vector field for the reference pictures having been used as the collocated reference picture and/or the reference pictures capable of being used as the collocated reference picture. In this case, if the current picture is the IDR picture, the decoder may be able to empty the motion vector field buffer in applying the TMVP. If the current picture is the CRA picture, it will be unable to empty the motion vector field buffer since the pictures preceding the CRA picture in the decoding order may be referred to by the RASL pictures.

That is, if it is possible for the decoder to empty the motion vector field buffer in case that the current picture is the IDR picture, efficient implementation of the decoder will be possible.

In relation to this, embodiments of the present document may include one or more of the following features.

1) As an example, if the current picture is composed of merged NAL unit type slices (if the value of the mixed_nalu_types_in_pic_flag syntax element is 1), the picture following the current picture in the decoding order may limit not to use the picture preceding the current picture in the decoding order as the collocated reference picture.

2) As another example, the limit may be applied in case that the current picture is composed of merged NAL unit type slices (the value of the mixed_nalu_types_in_pic flag syntax element is 1), and one or more NAL units for the current picture is of the IRAP type. For example, the IRAP type may be the IDR type or the CRA type.

3) In addition, if the picture includes one or more sub-pictures, the decoder/encoder may enable the picture following the picture in the decoding/encoding order not to select the picture preceding the picture as the collocated reference picture.

4) As another example, the limit may be specified as follows. The current picture and the picture following the current picture in the decoding order may be specified not to use the picture preceding the current picture in the decoding order as the collocated reference picture.

5) In processing the TMVP, a flag for the current picture indicating whether the pictures following the current picture in the decoding order can use the pictures preceding the current picture as the collocated reference picture may be signaled.

The flag may be signaled in the picture header, and the flag may be expressed in the form of pic_temporal_mvp_refresh_flag syntax element.

As another example, the flag may be signaled in the slice header, and the value of the flag may be limited to be the same in the slice header for the slices belonging to the same picture.

As still another example, the flag may be signaled in another parameter set, such as the PPS.

The flag may be limited to be present in case that i) the TMVP is enabled, and ii) the Temporal Id for the current picture is 0 (base temporal sub-layer).

If the value of the flag is 1, the decoder may further limit to empty the motion vector field buffer.

6) When the current picture is the IRAP picture, a certain picture following the current picture in the decoding order may limit not to use the picture preceding the current picture in the decoding order as the collocated reference picture. Further, the picture may be limited under a condition that the TemporalId for the current picture is 0 (base temporal sub-layer).

According to an embodiment proposed in the present document, image information may include NAL unit related information for a first picture and collocated reference picture related information for a second picture. Here, the second picture may mean a picture following the first picture in the decoding order.

For example, the NA unit related information for the first picture may include a merged NAL unit type flag. For example, the merged NAL unit type flag for the first picture may be related to whether a plurality of VCL-NAL units for the first picture do not have the same NAL unit type. That is, the merged NAL unit type flag for the first picture may indicate/represent whether the plurality of VCL-NAL units for the first picture do not have the same NAL unit type.

For example, the merged NAL unit type flag may be represented in the form of the mixed_nalu_types_in_pic_flag syntax element. For example, the mixed_nalu_types_in_pic_flag syntax element may specify whether the plurality of VCL-NAL units for the corresponding picture do not have the same NAL unit type.

Further, for example, the collocated reference picture related information for the second picture may include an sps_temporal_mvp_enabled_flag syntax element, a pic_temporal_mvp_enabled_flag syntax element, a num_ref_idx_active_override_flag syntax element, a num_ref_idx_ active_minus1[i] syntax element, a collocated_from_10_ flag syntax element, and a collocated_ref_idx syntax element as mentioned in the existing signaling example related to the TMVP.

For example, the syntax elements included in the collocated reference picture related information for the second picture may be signaled at each level as in Tables 1, 3, and 5 described above.

In this case, according to an embodiment, semantics of the collocated_ref_idx syntax element among the collocated reference picture related information for the second picture may be represented, for example, as in Table 7 below.

TABLE 7 collocated_ref_ idx specifies the reference index of the collocated picture used for temporal motion vector prediction-
When slice_type is equal to P or when slice_type is equal to B and collocated_from_l0_flag is equal to 1, collocated_ref_idx refits to a picture in list0, and the value of collocated_ref_idx shall be in the range of 0 to NumRefIdxActive[ 0 ] − 1, inclusive
When slice_rype is equal to B and collocated from_l0_flag is equal to 0 collocated_ref_idx refers to a picture in list 1, and the value of collocated_ref_idx shall be in the range of 0 to NumRefIdxActive[ 1 ] − 1, inclusive
When: collocated_ref_idx is not present, the value of collocated_ref_idx is inferred to be equal to 0.
It is a requirement of bitstream conformance tat the picture referred to by collocated_ref_ idx shall be the same for all slices of a coded picture.
It is a requirement of bitstream conformance that the resolutions of the reference picture referred to by collocated _ref_idx and the current picture shall be the same and
RefPicIsScaled[ collocated_from_l0_flag ?0 : 1 ][collocated_ref_idx ] shall be equal to 0.
It is a requirement of bitstream conformance that when the value of mixed_nalu_types_in_pic_flag is equal to 1 and the current picture contains one of more NAL unit of IRAP type, the collocated picture used by any of picture that fellow the current picture in decoding order shall not be a picture that precedes the current picture in decoding order.

NOTE
When the current picture contains one or more subpicture that may be merged with subpicture from other bitstream and the resulted picture may contain mixed NAL unit types with one sr more NAL units is IRAP type, encoder has to ensure that collocated picture selected for any pictures that follows the current picture in decoder order is not picture that precedes the current picture in decoding order.

That is, based on the NAL unit related information for the first picture, the third picture preceding the first picture in the decoding order may be limited not to use the first picture as the collocated reference picture for the second picture.

For example, if the value of the merged NAL unit type flag for the first picture is 1, the third picture may be limited not to be used as the collocated reference picture for the second picture.

For example, based on a case where the value of the merged NAL unit type flag for the first picture is 1, and any one of the plurality of VCL-NAL units for the first picture has an intra random access point (IRAP) type, the third picture may be limited not to be used as the collocated reference picture for the second picture.

For example, based on a case where the first picture is composed of a plurality of subpictures, and the VCL-NAL unit for any one of the plurality of subpictures has the IRAP type, the third picture may be limited not to be used as the collocated reference picture for the second picture.

As described above, by limiting the pictures preceding the IRAP picture not to be used as the collocated reference picture for the picture following the IRAP picture, efficient image coding may become possible.

According to an embodiment proposed in the present document, the collocated reference picture related information for the second picture may include a TMVP enabled flag. The 4 TMVP enabled flag may be related to whether the TMVP of the CLVS including the second picture is enabled. That is, the TMVP enabled flag may indicate/represent whether the TMVP of the CLVS including the second picture is enabled.

For example, the TMVP enabled flag may be represented in the form of the sps_temporal_mvp_enabled_flag syntax element. For example, the sps_temporal_mvp_enabled_flag syntax element may specify whether the TMVP of the CLVS including the second picture is enabled.

Further, according to an embodiment as described above, the collocated reference picture related information for the second picture may include a TMVP refresh flag. The TMVP refresh flag may be related to whether the pictures preceding the second picture in the decoding order is not used as the collocated reference picture of the pictures following the second picture. That is, the TMVP refresh flag may indicate/represent whether the pictures preceding the second picture in the decoding order is not used as the collocated reference picture of the pictures following the second picture.

For example, the TMVP refresh flag may be represented in the form of the pic_temporal_mvp_refresh_flag syntax element. For example, the pic_temporal_mvp_refresh_flag syntax element may specify whether the pictures preceding the second picture in the decoding order is not used as the collocated reference picture of the pictures following the second picture.

For example, according to an embodiment as described above, the picture header may include a syntax of Table 8 below. The syntax of Table 8 below may be a part of the picture header.

TABLE 8

|  | Descriptor |
| --- | --- |
| picture_header_rbsp( ) { |  |
| ... |  |
| if(sps_temporal_mvp_enabled_flag) { |  |
|   pic_temporal_myp_enabled_flag | u(1) |
|   if( TemporalId = = 0 ) |  |
|     pic_temporal_mvp_refresh_flag | u(1) |
| } |  |
| ... |  |
| } |  |

Here, semantics of the syntax element included in the syntax of Table 8 above may be represented, for example, as in Table 9 below.

TABLE 9 pic_temporal_mvp_enabled_flag specifies whether temporal motion vector predictors can be used for inter prediction for slices associated with the PH. If pic_temporal_mvp_enabled_flag is equal to 0, the syntax elements of the slices associated with the PH shall be constrained such that no temporal motion vector predictor is used in decoding of the slices. Otherwise (pic_temporal_mvp_enabled_flag is equal to 1), temporal motion vector predictors may be used in decoding of die slices associated with the PH When not present the value of pic_temporal_myp_enabled_flag is inferred to be equal to 0. When no reference picture in the DPB has the same spatial resolution as the current picture, the value of pic_temporal_mvp_enabled_flag shall be equal to 0.
pic_temporal_mvp_refresh_flag equal 1 specifies pictures that precede the picture associated with the picture header in decoding order are not used as collocated reference picture for any picture that follows the picture associated with the picture header in decoder order.

NOTE
When file value of pic_temporal_myp_refresh_flag is equal to 1, decoder may empty the motion vector field buffer after the decoding of the picture associated with the picture header.

That is, the sps_temporal_mvp_enabled_flag syntax element may represent whether the TMVP of the CLVS including the second picture is enabled based on whether the value thereof is 0 or 1. The sps_temporal_mvp_enabled_flag syntax element may be called the TMVP enabled flag, and may be signaled through the SPS. For example, the TMVP enabled flag may be the same as the first TMVP enabled flag presented in relation to Table 1 above.

The pic_temporal_mvp_enabled_flag syntax element may represent whether the TMVP is used for inter prediction of slices based on whether the value thereof is 0 or 1. The pic_temporal_mvp_enabled_flag syntax element may be signaled through the picture header. For example, the pic_temporal_mvp_enabled_flag syntax element may be the same as the second TMVP enabled flag presented in relation to Table 3 above.

The pic_temporal_mvp_refresh_flag syntax element may represent whether the pictures preceding the second picture in the decoding order is not used as the collocated reference picture of the pictures following the second picture. The pic_temporal_mvp_refresh_flag syntax element may be called the TMVP refresh flag, and may be signaled through the picture header.

According to an embodiment as described above, if the value of the TMVP enabled flag is 1, the pic_temporal_mvp_refresh_flag syntax element may be included in the picture header. If the value of the TMVP enabled flag is not 1, the pic_temporal_mvp_refresh_flag syntax element may not be present in the picture header.

Further, if the value of the TMVP enabled flag is 1, the TMVP refresh flag may be included in the picture header. If the value of the TMVP enabled flag is not 1, the TMVP refresh flag may not be present in the picture header.

For example, if the temporal layer ID of the second picture related to the picture header is derived as 0, the TMVP refresh flag may be included in the picture header. If the temporal layer ID of the second picture related to the picture header is not derived as 0, the TMVP refresh flag may not be present in the picture header.

According to an embodiment as described above, if the value of the TMVP refresh flag for the second picture is 1, the decoding apparatus may empty a motion vector field buffer after the second picture is decoded.

As described above, by emptying the motion vector field buffer, the image coding efficiency can be improved.

According to an embodiment proposed in the present document, if the value of the TMVP enabled flag is 1, the TMVP refresh flag may be included in the PPS instead of the picture header. If the value of the TMVP enabled flag is not 1, the TMVP refresh flag may not be present in the PPS.

For example, if the temporal layer ID of the second picture referring to the PPS is derived as 0, the TMVP refresh flag may be included in the PPS instead of the picture header. If the temporal layer ID of the second picture referring to the PPS is not derived as 0, the TMVP refresh flag may not be present in the PPS.

Further, according to an embodiment proposed in the present document, if the value of the TMVP enabled flag is 1, the TMVP refresh flag may be included in the slice header (SH) instead of the PPS. If the value of the TMVP enabled flag is not 1, the TMVP refresh flag may not be present in the slice header.

For example, if the temporal layer ID of the second picture related to the slice header is derived as 0, the TMVP refresh flag may be included in the slice header instead of the PPS. If the temporal layer ID of the second picture related to the slice header is not derived as 0, the TMVP refresh flag may not be present in the slice header.

For example, in this case, the TMVP refresh flag may be limited to have the same value in the slice header of all slices in the second picture.

According to an embodiment proposed in the present document, semantics of the collocated_ref_idx syntax element among the collocated reference picture related information for the second picture may be represented, for example, as in Table 10 below.

TABLE 10 collocated_ref_idx specifies the reference index of the collocated picture used for temporal motion vector prediction.
When slice_type is equal to P or when slice_type is equal to B and collocated_from_l0_flag is, equal to 1, collocated_ref_idx refers to a picture in list 0, and the value of collocated_ref_idx shall be in the range of 0 to NumRefIdxActive[ 0 ] − 1, inclusive.
When slice_type is, equal to B and collocated _from_l0_flag is equal to 0, collocated_ref_idx refers to a picture in list 1, and the value of collocated_ref_idx shall be in the range of 0 to NumRefIdxActive[ 1 ] − 1, inclusive.
When collocated_ref_idx is not present, the value of collocated_ref_idx is inferred to be equal to 0.
It is a requirement of bitstream conformance that the picture referred to by collocated_ref_idx shall be the same for all slices of a coded picture.
It is a requirement of bitstream conformance that the resolutions of the reference picture referred to by collocated_ref_idx and the current picture shall be the same and
RefPicIsScaled[ collocated_from_l0_flag ? 0 : 1 ][ collocated_ref_idx ] shall be equal to 0.

TABLE 10-continued

It is a requirement of bitstream conformance that when the current picture is an IRAP picture, the collocated picture used by any of picture that follows the current picture in decoding order shall not be picture that precedes the current picture in decoding order.

That is, based on a case where the first picture is an IRAP type picture, the third picture may be limited not to be used as the collocated reference picture for the second picture.

As described above, by not using the picture preceding the IRAP type picture as the collocated reference picture for the picture following the IRAP type picture, the image coding efficiency can be enhanced.

The following drawing has been prepared to explain a specific example of the present specification. Since the title of a specific device described in the drawing or the title of a specific signal/message/field is exemplarily presented, the technical feature of the present specification is not limited to the specific title used in the following drawings.

Figure 11:
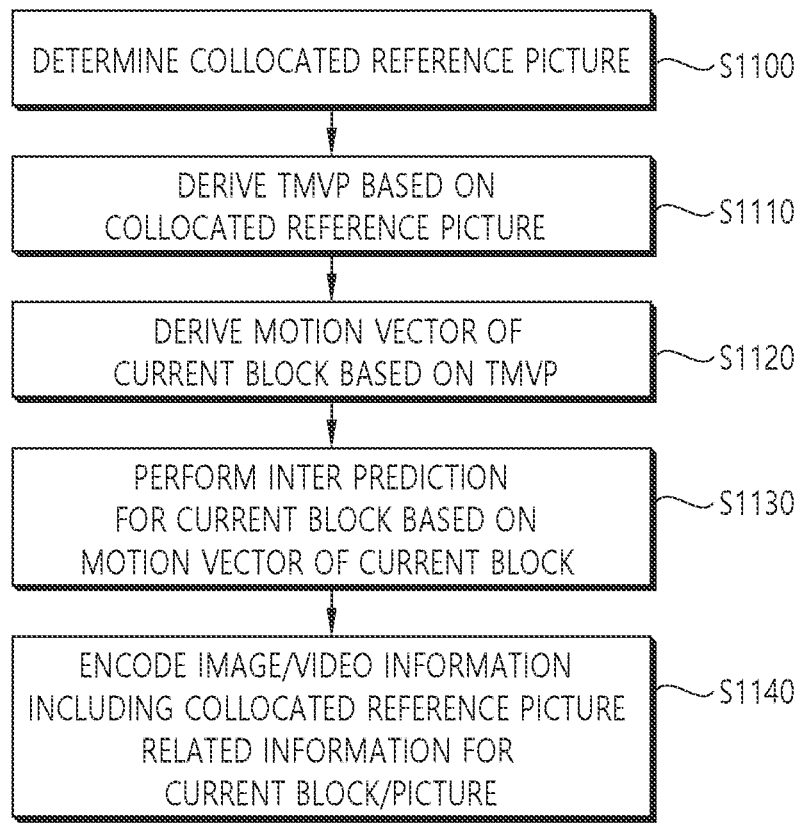
FIGS. 11 and 12 schematically illustrate a video/image encoding method and an example of related components according to embodiment(s) of the present document.
Figure 12:
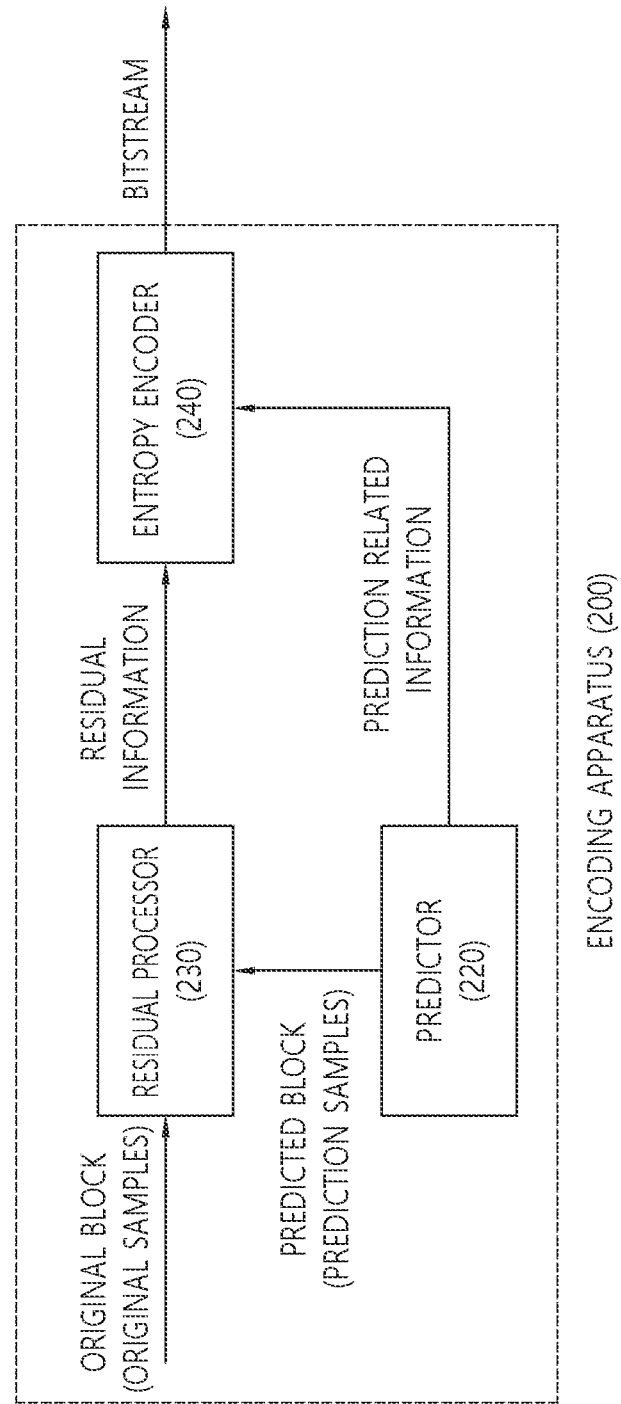

FIGS. 11 and 12 schematically illustrate a video/image encoding method and an example of related components according to embodiment(s) of the present document. The method disclosed in FIG. 11 may be performed by the encoding apparatus disclosed in FIG. 2. Specifically, for example, S1100, S1110, S1120, and S1130 of FIG. 11 may be performed by the predictor 220 of the encoding apparatus, and S1140 of FIG. 11 may be performed by the entropy encoder 240 of the encoding apparatus. The method disclosed in FIG. 11 may include the embodiments as described above in FIG. 11.

Referring to FIG. 11, the encoding apparatus determines the collocated reference picture (S1100). For example, the encoding apparatus may determine the collocated reference picture for the second picture. In this case, the encoding apparatus may determine whether a specific picture is limited as the collocated reference picture for TMVP derivation. For example, the encoding apparatus may determine the collocated reference picture from picture candidates, and some candidates are unable to be determined as the collocated reference picture by the limit. Determination of whether to be limited as the collocated reference picture for the TMVP derivation may be performed based on embodiments proposed in the present document. The collocated reference picture may be called a collocated picture or a col picture. The encoding apparatus may generate information related to the collocated reference picture for the second picture. The information related to the collocated reference picture for the second picture may include information/syntax elements presented in an embodiment proposed in the present document. For example, the information related to the collocated reference picture may be included in the picture header and the slice header. As an example, the information related to the collocated reference picture may include information for selecting the collocated reference picture based on a POC difference and the sign of the POC difference. As another example, the information related to the collocated reference picture may include a reference picture list of the current block/current picture and index information for selecting the collocated reference picture from the reference picture list. Here, the current picture means the second picture.

The encoding apparatus derives the TMVP based on the collocated reference picture (S1110). The encoding apparatus may derive the TMVP based on the collocated reference picture for the second picture. The TMVP may be derived based on a temporal neighboring block in the collocated reference picture. The temporal neighboring block may include a collocated reference block or colCb. The collocated reference block is located within the collocated reference picture, but may be a block having the same location and size as those of the current block. The colCb may be referred to as the collocated reference block. As an example, the colCb may be a luma coding block including the location in the collocated reference picture, which has moved through ((xColBr»3)«3, (yColBr»3)«3). As still another example, the colCb may be a luma coding block including the location in the collocated reference picture, which has moved through ((xColCtr»3)«3, (yColCtr»3) «3). Here, the (xColBr, yColBr) may represent a right-bottom sample location outside the collocated reference block. Further, the (xColCtr, yColCtr) may represent a right-bottom sample among four center samples inside the collocated reference block. That is, it is represented that xColBr=xCb+cbWidth, yColBr=yCb+cbHeight, and xColCtr=xCb+(cbWidth»1), yColCtr=yCb+(cbHeight»1). Here, the (xCb, yCb) may represent a top-left sample location of the current block. The cbWidth and cbHeight may represent the width and the height of the current block, respectively.

The encoding apparatus derives a motion vector of the current block based on the TMVP (S1120). The TMVP may be used as a temporal merge candidate and/or temporal MVP candidate. As an example, in case that a merge mode is applied to the current block, a merge candidate list may be configured, and the temporal merge candidate including the TMVP may be configured as a candidate in the merge candidate list. As still another example, in case that an (A)MVP mode is applied to the current block, an MVP candidate list may be configured, and a temporal MVP candidate including the TMVP may be configured as a candidate in the MVP candidate list. The encoding apparatus may select any one candidate among candidates in the merge candidate list or the MVP candidate list, and may generate selection information (merge index and MVP flag) for signaling the information related to the selected candidate to the decoding apparatus. Based on the selection information, the motion vector for the current block may be derived.

The encoding apparatus perform inter prediction for the current block based on the motion vector of the current block (S1130). In order to generate prediction samples of the current block, the encoding apparatus may perform inter prediction inter prediction based on the motion vector of the current block. Further, the encoding apparatus may derive residual samples based on prediction samples of the current block, and may generate residual information related to the residual samples.

The encoding apparatus encodes image/video information including the collocated reference picture related information for the current block/current picture (S1140). That is, the encoding apparatus may encode the image/video information including the collocated reference picture related information for the second picture. The image/video information may include prediction information and the residual information. For example, the prediction information may be called prediction related information, and may include at least one of the collocated reference picture related information, the selection information, MVD information, and/or the residual information.

The encoded image/video information may be output in the form of a bitstream. The bitstream may be transmitted to the decoding apparatus through a network or a storage medium.

Specifically, the encoding apparatus may generate NAL unit related information for the first picture. The image information may further include the NAL unit related information for the first picture. Here, the picture following the first picture in the decoding order may be the second picture, and the decoding order may correspond to the coding order or the encoding order. For example, the NAL unit related information may include a merge NAL unit type flag. For example, the NAL unit related information may include the mixed_nalu_types_in_pic_flag syntax element.

For example, in this case, the third picture preceding the first picture may be limited not to be used as the collocated reference picture for the second picture. That is, the third picture may not be derived as the collocated reference picture for the TMVP derivation for the second picture.

For example, in case that the value of the NAL unit type flag for the first picture is 1, and any one of the plurality of VCL-NAL units for the first picture has an intra random access point (IRAP) type, the third picture may be limited not to be used as the collocated reference picture for the second picture. That is, in case that the value of the merge NAL unit type flag is 1, and any one of the plurality of VCL-NAL units for the first picture has the IRAP type, the third picture may not be derived as the collocated reference picture for the TMVP derivation for the second picture.

For example, based on a case where the first picture is composed of a plurality of subpictures by the image partitioner 210, and the VCL-NAL unit for any one of the plurality of subpictures has the IRAP type, the third picture may be limited not to be used as the collocated reference picture for the second picture. That is, based on the case where the first picture is composed of the plurality of subpictures, and the VCL-NAL unit for any one of the plurality of subpictures has the IRAP type, the third picture may not be derived as the collocated reference picture for the second picture.

For example, the collocated reference picture related information may include at least one of the TMVP enabled flag and/or the TMVP refresh flag. For example, the collocated reference picture related information may include at least one of the sps_temporal_mvp_enabled_flag, the pic_temporal_mvp_enabled_flag, the num_ref_idx_active_override_flag, the num_ref_idx_active_minus1[i], the collocated_from_l0_flag, the collocated_ref_idx, the pic_temporal_mvp_enabled_flag, and/or the pic_temporal_mvp_refresh_flag syntax elements.

That is, the image/video information may include the NAL unit related information for the first picture and the collocated reference picture related information for the second picture. Further, the image/video information may include various pieces of information according to an embodiment of the present document. For example, the image/video information may include information disclosed in at least one of Tables 1, 3, 5, and/or 8 as described above.

Specifically, the collocated reference picture related information for the second picture may include various pieces of information according to an embodiment of the present document.

For example, the collocated reference picture related information for the second picture may include the TMVP enabled flag. For example, the TMVP enabled flag may be related to whether the TMVP of the CLVS including the second picture is enabled. That is, the TMVP enabled flag may indicate/represent whether the TMVP of the CLVS including the second picture is enabled.

For example, the TMVP enabled flag may be represented in the form of the sps_temporal_mvp_enabled_flag syntax element. For example, the sps_temporal_mvp_enabled_flag syntax element may specify whether the TMVP of the CLVS including the second picture is enabled. For example, the TMVP enabled flag may be included in the SPS.

Further, the collocated reference picture related information for the second picture may include the TMVP refresh flag. For example, the TMVP refresh flag may be related to whether the pictures preceding the second picture in the decoding order are not used as the collocated reference picture of the pictures following the second picture. That is, the TMVP refresh flag may indicate/represent whether the pictures preceding the second picture in the decoding order are not used as the collocated reference picture of the pictures following the second picture.

For example, the TMVP refresh flag may be represented in the form of the pic_temporal_mvp_refresh_flag syntax element. For example, the pic_temporal_mvp_refresh_flag syntax element may specify whether the pictures preceding the second picture in the decoding order are not used as the collocated reference picture of the pictures following the second picture.

For example, if the value of the TMVP enabled flag is 1, the TMVP refresh flag may be included in the picture header. For example, based on the case where the temporal layer ID of the second picture related to the picture header is derived as 0, the TMVP refresh flag may be included in the picture header.

Figure 13:
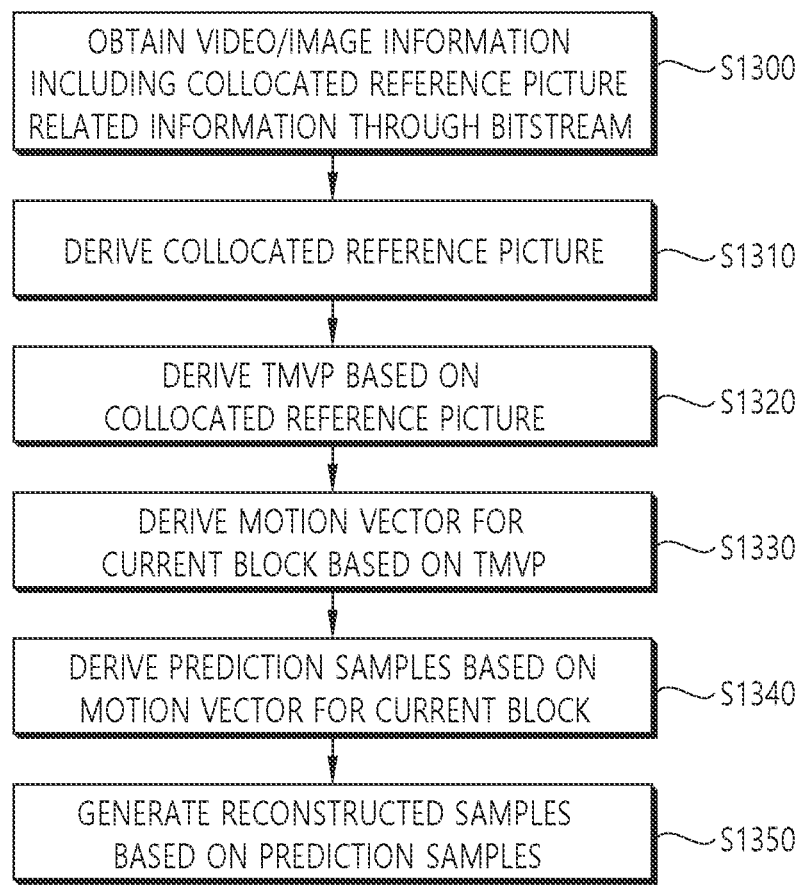
FIG. 13 and FIG. 14 schematically illustrate an image/video decoding method and an example of related components according to an embodiment of the present document.
Figure 14:
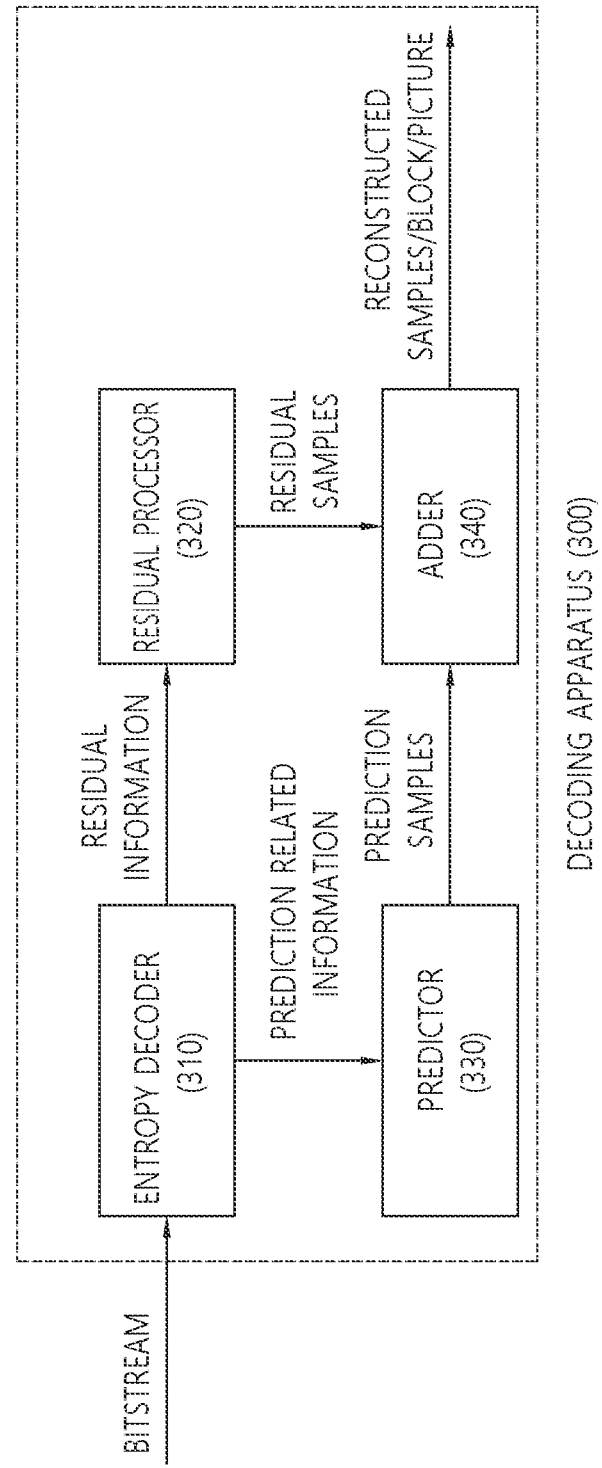

FIGS. 13 and 14 schematically illustrate a video/image decoding method and an example of related components according to an embodiment of the present document. The method disclosed in FIG. 13 may be performed by the decoding apparatus disclosed in FIG. 3. Specifically, for example, S1300 of FIG. 13 may be performed by the entropy decoder 310 of the decoding apparatus, S1310, S1320, S1330, and S1340 of FIG. 13 may be performed by the predictor 330 and the inter predictor 332, and S1350 of FIG. 13 may be performed by the adder 340 of the decoding apparatus. The method disclosed in FIG. 13 may include the embodiments disclosed above in the present document.

Referring to FIG. 13, the decoding apparatus receives/obtains image/video information (S1300). The decoding apparatus may receive/obtain the image/video information through a bitstream. The image/video information may include the prediction information and/or the residual information. The prediction information may include at least one of the collocated reference picture related information, the selection information, the MVD information, and/or the residual information. For example, the image/video information may include NAL unit related information for the first picture and the collocated reference picture related information for the second picture. Further, the image/video information may include various pieces of information according to an embodiment of the present document. For example, the image/video information may include information disclosed in at least one of Tables 1, 3, 5, and/or 8 as described above.

The decoding apparatus derives the collocated reference picture based on the collocated reference picture related information (S1310). For example, the decoding apparatus may derive the collocated reference picture for the current picture based on the collocated reference picture related information. Here, the current picture may represent the second picture. That is, the decoding apparatus may derive the collocated reference picture for the second picture based on the collocated reference picture related information. For example, the decoding apparatus may determine whether a specific picture is limited as the collocated reference picture for TMVP derivation. The decoding apparatus may determine the collocated reference picture from picture candidates, and some candidates are unable to be determined as the collocated reference picture by the limit. Determination of whether to be limited as the collocated reference picture for the TMVP derivation may be performed based on embodiments proposed in the present document. The information related to the collocated reference picture may include information/syntax elements mentioned in an embodiment proposed in the present document. For example, the information related to the collocated reference picture may be included in the picture header and the slice header. As an example, the information related to the collocated reference picture may include information for selecting the collocated reference picture based on a POC difference and the sign of the POC difference. As another example, the information related to the collocated reference picture may include a reference picture list of the current block/current picture and index information for selecting the collocated reference picture from the reference picture list.

The decoding apparatus derives the TMVP based on the collocated reference picture (S1310). For example, the encoding apparatus may derive the TMVP based on the collocated reference picture for the second picture. The TMVP may be derived based on a temporal neighboring block in the collocated reference picture. The temporal neighboring block may include a collocated reference block or colCb. The collocated reference block is located within the collocated reference picture, but may be a block having the same location and size as those of the current block. The colCb may be referred to as the collocated reference block. As an example, the colCb may be a luma coding block including the location in the collocated reference picture, which has moved through ((xColBr»3)«3, (yColBr»3) «3). As still another example, the colCb may be a luma coding block including the location in the collocated reference picture, which has moved through ((xColCtr»3)«3, (yColCtr»3)«3). Here, the (xColBr, yColBr) may represent a right-bottom sample location outside the collocated reference block. Further, the (xColCtr, yColCtr) may represent a right-bottom sample among four center samples inside the collocated reference block. That is, it is represented that xColBr=xCb+cbWidth, yColBr=yCb+cbHeight, and xColCtr=xCb+(cbWidth»1), yColCtr=yCb+(cbHeight»1). Here, the (xCb, yCb) may represent a top-left sample location of the current block. The cbWidth and cbHeight may represent the width and the height of the current block, respectively.

The decoding apparatus derives a motion vector of the current block based on the TMVP (S1330). The TMVP may be used as a temporal merge candidate and/or temporal MVP candidate. As an example, in case that a merge mode is applied to the current block, a merge candidate list may be configured, and the temporal merge candidate including the TMVP may be configured as a candidate in the merge candidate list. As another example, in case that an (A)MVP mode is applied to the current block, an MVP candidate list may be configured, and a temporal MVP candidate including the TMVP may be configured as a candidate in the MVP candidate list. The encoding apparatus may select any one candidate among candidates in the merge candidate list or the MVP candidate list, and may generate selection information (merge index and MVP flag) for signaling the information related to the selected candidate to the decoding apparatus. Based on the selection information, the motion vector for the current block may be derived.

The decoding apparatus perform inter prediction for the current block based on the motion vector of the current block (S1340). In order to generate prediction samples of the current block, the encoding apparatus may perform inter prediction inter prediction based on the motion vector of the current block. Further, the encoding apparatus may derive residual samples based on prediction samples of the current block, and may generate residual information related to the residual samples.

The decoding apparatus generates reconstructed samples based on prediction samples (S1350). The decoding apparatus may generate a reconstructed picture or a reconstructed sample based on the prediction samples and the residual samples. For example, the decoding apparatus may perform in-loop filtering for the reconstructed picture.

Specifically, the decoding apparatus may limit the third picture preceding the first picture not to be used as the collocated reference picture for the second picture following the first picture in the decoding order. That is, the picture following the first picture in the decoding order may be the second picture. In this case, the third picture may not be derived as the collocated reference picture for the TMVP derivation for the second picture.

For example, in case that the value of the NAL unit type flag for the first picture is 1, and any one of the plurality of VCL-NAL units for the first picture has an intra random access point (IRAP) type, the third picture may be limited not to be used as the collocated reference picture for the second picture. That is, in case that the value of the merge NAL unit type flag is 1, and any one of the plurality of VCL-NAL units for the first picture has the IRAP type, the third picture may not be derived as the collocated reference picture for the TMVP derivation for the second picture.

For example, based on a case where the first picture is composed of a plurality of subpictures, and the VCL-NAL unit for any one of the plurality of subpictures has the IRAP type, the third picture may be limited not to be used as the collocated reference picture for the second picture. That is, based on the case where the first picture is composed of the plurality of subpictures, and the VCL-NAL unit for any one of the plurality of subpictures has the IRAP type, the third picture may not be derived as the collocated reference picture for the second picture.

Specifically, the NAL unit related information for the first picture may include a merge NAL unit type flag. For example, the merge NAL unit type flag for the first picture may be related to whether the plurality of VCL-NAL units for the first picture do not have the same NAL unit type. That is, the merge NAL unit type flag for the first picture may indicate/represent whether the plurality of VCL-NAL units for the first picture do not have the same NAL unit type.

For example, the merge NAL unit type flag may be represented in the form of the mixed_nalu_types_in_pic_flag syntax element. For example, the mixed_nalu_types_in_pic_flag syntax element may specify whether the plurality of VCL-NAL units for the corresponding picture do not have the same NAL unit type.

For example, the collocated reference picture related information for the second picture may include the TMVP enabled flag. For example, the TMVP enabled flag may be related to whether the TMVP of the CLVS including the second picture is enabled. That is, the TMVP enabled flag may indicate/represent whether the TMVP of the CLVS including the second picture is enabled.

For example, the TMVP enabled flag may be represented in the form of the sps_temporal_mvp_enabled_flag syntax element. For example, the sps_temporal_mvp_enabled_flag syntax element may specify whether the TMVP of the CLVS including the second picture is enabled. For example, the TMVP enabled flag may be included in the SPS.

Further, the collocated reference picture related information for the second picture may include the TMVP refresh flag. For example, the TMVP refresh flag may be related to whether the pictures preceding the second picture in the decoding order are not used as the collocated reference picture of the pictures following the second picture. That is, the TMVP refresh flag may indicate/represent whether the pictures preceding the second picture in the decoding order are not used as the collocated reference picture of the pictures following the second picture.

For example, the TMVP refresh flag may be represented in the form of the pic_temporal_mvp_refresh_flag syntax element. For example, the pic_temporal_mvp_refresh_flag syntax element may specify whether the pictures preceding the second picture in the decoding order are not used as the collocated reference picture of the pictures following the second picture.

For example, if the value of the TMVP enabled flag is 1, the TMVP refresh flag may be included in the picture header. For example, based on the case where the temporal layer ID of the second picture related to the picture header is derived as 0, the TMVP refresh flag may be included in the picture header. In this case, as an example, if the value of the TMVP refresh flag for the second picture is 1, the decoding apparatus may empty the motion vector field buffer after the second picture is decoded.

Further, for example, based on the case where the first picture is the IRAP type picture, the third picture may be limited not to be used as the collocated reference picture for the second picture.

As another example, if the value of the TMVP enabled flag is 1, the TMVP refresh flag may be included in the PPS instead of the picture header.

For example, if the temporal layer ID of the second picture referring to the PPS is derived as 0, the TMVP refresh flag may be included in the PPS instead of the picture header.

As still another example, if the value of the TMVP enabled flag is 1, the TMVP refresh flag may be included in the slice header (SH) instead of the PPS.

For example, if the temporal layer ID of the second picture is derived as 0, the TMVP refresh flag may be included in the slice header instead of the PPS.

For example, in this case, the TMVP refresh flag for the second picture may have the same value in the slice header of all the slices in the second picture.

Although methods have been described on the basis of a flowchart in which steps or blocks are listed in sequence in the above-described embodiments, the steps of the embodiments are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the embodiments of the present document.

The aforementioned method according to the embodiments of the present document may be in the form of software, and the encoding apparatus and/or decoding apparatus according to the present document may be included in a device for performing image processing, for example, a TV, a computer, a smart phone, a set-top box, a display device, or the like.

When the embodiments are implemented in software in the present document, the aforementioned method may be implemented using a module (procedure, function, etc.) which performs the aforementioned function. The module may be stored in a memory and executed by a processor. The memory may be disposed to the processor internally or externally and connected to the processor using various well-known means. The processor may include application-specific integrated circuit (ASIC), other chipsets, logic circuits, and/or data processors. The memory may include a read-only memory (ROM), a random access memory (RAM), a flash memory, a memory card, storage media and/or other storage devices. That is, the embodiments described herein may be implemented and performed on a processor, a microprocessor, a controller, or a chip. For example, the functional units shown in each drawing may be implemented and performed on a computer, a processor, a microprocessor, a controller, or a chip. In this case, information for implementation (e.g., information on instructions) or an algorithm may be stored in a digital storage medium.

Further, the decoding apparatus and the encoding apparatus to which the embodiment(s) of the present document is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, camcorder, a video on demand (VoD) service provider, an over the top video (OTT) device, an internet streaming service provider, a 3D video device, a virtual reality (VR) device, an augment reality (AR) device, an image telephone video device, a vehicle terminal (e.g., a vehicle (including an autonomous vehicle) terminal, an airplane terminal, a ship terminal, etc.) and a medical video device, and the like, and may be used to process a video signal or a data signal. For example, the OTT video device may include a game console, a Blu-ray player, an Internet-connected TV, a home theater system, a smartphone, a tablet PC, a digital video recorder (DVR), and the like.

Further, the processing method to which the embodiment(s) of the present document is applied may be produced in the form of a program being executed by a computer and may be stored in a computer-readable recording medium. Multimedia data having a data structure according to the embodiment(s) of the present document may also be stored in the computer-readable recording medium. The computer readable recording medium includes all kinds of storage devices and distributed storage devices in which computer readable data is stored. The computer-readable recording medium may be, for example, a Blu-ray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (e.g., transmission over the Internet). Further, a bitstream generated by the encoding method may be stored in the computer-readable recording medium or transmitted through a wired or wireless communication network.

In addition, the embodiment(s) of the present document may be embodied as a computer program product based on a program code, and the program code may be executed on a computer by the embodiment(s) of the present document. The program code may be stored on a computer-readable carrier.

Figure 15:
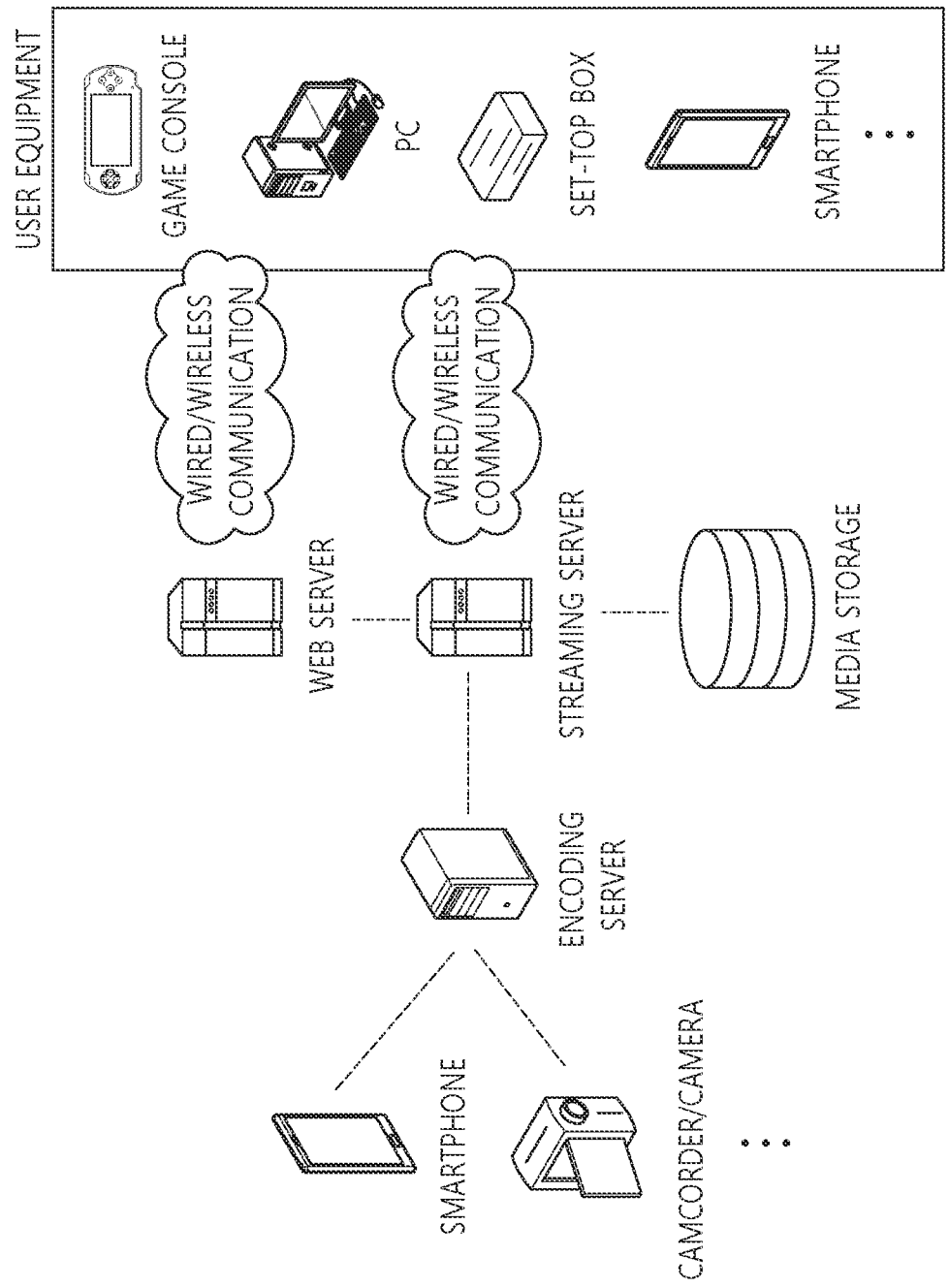
FIG. 15 shows an example of a content streaming system to which embodiments disclosed in the present document are applicable.

FIG. 15 represents an example of a content streaming system to which the embodiments described in the present document may be applied.

Referring to FIG. 15, the content streaming system to which the embodiments of the present document are applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present document are applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the content streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the content streaming system may be operated as a distributed server, and in this case, data received by each server may be processed in distributed manner.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claims of the present specification and the technical features of the apparatus claims may be combined to be implemented as an apparatus, and the technical features of the method claims and the technical features of the apparatus claims of the present specification may be combined and implemented as a method.

What is claimed is:

1. An image decoding method performed by a decoding apparatus, the method comprising:
    obtaining image information through a bitstream, wherein the image information includes NAL unit related information for a first picture and collocated reference picture related information for a second picture;
    deriving a collocated reference picture for the second picture based on the collocated reference picture related information;
    deriving a temporal motion vector predictor (TMVP) based on the collocated reference picture for the second picture;
    deriving a motion vector for a current block included in the second picture based on the TMVP;
    deriving prediction samples of the current block based on the motion vector for the current block; and
    generating reconstructed samples based on the prediction samples,
    wherein based on the NAL unit related information for the first picture, a third picture preceding the first picture in a decoding order is limited not to be used as the collocated reference picture for the second picture following the first picture in the decoding order,
    wherein the NAL unit related information for the first picture includes a mixed NAL unit type flag related to whether a plurality of VCL-NAL units for the first picture do not have a same NAL unit type, and
    wherein based on a case where a value of the mixed NAL unit type flag for the first picture is 1 and a case where any one of the plurality of VCL-NAL units for the first picture has an intra random access point (IRAP) type, the third picture is limited not to be used as the collocated reference picture for the second picture.

2. The method of claim 1, wherein based on a case where the first picture is composed of a plurality of subpictures and a case where a VCL-NAL unit for any one of the plurality of subpictures has an IRAP type, the third picture is limited not to be used as the collocated reference picture for the second picture.

3. The method of claim 1, wherein the collocated reference picture related information for the second picture includes a TMVP enabled flag, related to whether the TMVP is enabled in a coded layer video sequence (CLVS) including the second picture, and a TMVP refresh flag,
    wherein the TMVP refresh flag for the second picture is related to whether pictures preceding the second picture in the decoding order are not used as the collocated reference picture for pictures following the second picture, and
    wherein the TMVP enabled flag is included in a sequence parameter set (SPS).

4. The method of claim 3, wherein based on a case where a value of the TMVP enabled flag is 1, the TMVP refresh flag is included in a picture header (PH), and
    wherein based on a case where a temporal layer ID of the second picture related to the picture header is derived as 0, the TMVP refresh flag is included in the picture header.

5. The method of claim 3, wherein based on a case where a value of the TMVP refresh flag for the second picture is 1, the decoding apparatus empty a motion vector field buffer after the second picture is decoded.

6. The method of claim 3, wherein based on a case where a value of the TMVP enabled flag is 1, the TMVP refresh flag is included in a picture parameter set (PPS), and wherein based on a case where a temporal layer ID of the second picture referring to the PPS is derived as 0, the TMVP refresh flag is included in the PPS.

7. The method of claim 3, wherein based on a case where a value of the TMVP enabled flag is 1, the TMVP refresh flag is included in a slice header (SH), wherein based on a case where a temporal layer ID of the second picture related to the slice header is derived as 0, the TMVP refresh flag is included in the slice header, and wherein the TMVP refresh flag for the second picture has the same value in slice headers of all slices in the second picture.

8. The method of claim 1, based on a case where the first picture is an IRAP type picture, the third picture is limited not to be used as the collocated reference picture for the second picture.

9. An image encoding method performed by an encoding apparatus, the method comprising:

generating NAL unit related information for a first picture;

deriving a collocated reference picture to derive a temporal motion vector predictor (TMVP) for a second picture;

generating collocated reference picture related information related to the collocated reference picture; and encoding image information including the NAL unit related information for the first picture and the collocated reference picture related information for the second picture, wherein based on the NAL unit related information for the first picture, a third picture preceding the first picture in a decoding order is limited not to be used as the collocated reference picture for the second picture following the first picture in the decoding order, wherein the NAL unit related information for the first picture includes a mixed NAL unit type flag related to whether a plurality of VCL-NAL units for the first picture do not have a same NAL unit type, and wherein based on a case where a value of the mixed NAL unit type flag for the first picture is 1 and a case where any one of the plurality of VCL-NAL units for the first picture has an intra random access point (IRAP) type, the third picture is limited not to be used as the collocated reference picture for the second picture.

10. The method of claim 9, wherein based on a case where the first picture is composed of a plurality of subpictures and a case where a VCL-NAL unit for any one of the plurality of subpictures has an IRAP type, the third picture is limited not to be used as the collocated reference picture for the second picture.

11. The method of claim 9, wherein the collocated reference picture related information for the second picture includes a TMVP enabled flag, related to whether the TMVP is enabled in a coded layer video sequence (CLVS) including the second picture, and a TMVP refresh flag, wherein the TMVP refresh flag for the second picture is related to whether pictures preceding the second picture in a decoding order are not used as the collocated reference picture for pictures following the second picture, and wherein the TMVP enabled flag is included in a sequence parameter set (SPS).

12. The method of claim 11, wherein based on a case where a value of the TMVP enabled flag is 1, the TMVP refresh flag is included in a picture header (PH), and wherein based on a case where a temporal layer ID of the second picture related to the picture header is derived as 0, the TMVP refresh flag is included in the picture header.

13. A computer-readable digital storage medium storing a bitstream generated based on an image encoding method, the image encoding method comprising:

generating NAL unit related information for a first picture;

deriving a collocated reference picture to derive a temporal motion vector predictor (TMVP) for a second picture;

generating collocated reference picture related information related to the collocated reference picture; and encoding image information including the NAL unit related information for the first picture and the collocated reference picture related information for the second picture, wherein based on the NAL unit related information for the first picture, a third picture preceding the first picture in a decoding order is limited not to be used as the collocated reference picture for the second picture following the first picture in the decoding order, wherein the NAL unit related information for the first picture includes a mixed NAL unit type flag related to whether a plurality of VCL-NAL units for the first picture do not have a same NAL unit type, and wherein based on a case where a value of the mixed NAL unit type flag for the first picture is 1 and a case where any one of the plurality of VCL-NAL units for the first picture has an intra random access point (IRAP) type, the third picture is limited not to be used as the collocated reference picture for the second picture.

* * * * *